(12) United States Patent  
Flanagan

(10) Patent No.: US 7,311,120 B2  
(45) Date of Patent: Dec. 25, 2007

(54) EXPANDABLE PIPE STOPPER

(75) Inventor: Michael Eric Flanagan, Doncaster (GB)

(73) Assignee: Advanced Sewer Products Limited, Rotherham (GB)

( * ) Notice: Subject to any disclaimer, the term of this patent is extended or adjusted under 35 U.S.C. 154(b) by 516 days.

(21) Appl. No.: 10/804,824

(22) Filed: Mar. 19, 2004

(65) Prior Publication Data

US 2004/0187945 A1    Sep. 30, 2004

(30) Foreign Application Priority Data

| Mar. 20, 2003 | (GB) | ................... | 0306424.3 |
| Jul. 25, 2003 | (GB) | ................... | 0317358.0 |
| Feb. 4, 2004 | (GB) | ................... | 0402436.0 |

(51) Int. Cl.
    *F16L 55/10* (2006.01)
(52) U.S. Cl. .............................. 138/89; 138/90; 138/92
(58) Field of Classification Search .................. 138/90, 138/89, 92

See application file for complete search history.

(56) References Cited

U.S. PATENT DOCUMENTS

| 411,978 | A | * | 10/1889 | Chisholm | .................. | 138/94 |
| 2,299,434 | A | * | 10/1942 | Svirsky | ..................... | 138/90 |
| 2,725,112 | A | * | 11/1955 | Weisman et al. | ............ | 137/362 |
| 3,457,959 | A | * | 7/1969 | Cooper | ......................... | 138/90 |
| 3,485,118 | A | * | 12/1969 | Maughan, Jr. | ................ | 81/125 |
| 3,665,966 | A | * | 5/1972 | Ver Nooy | ..................... | 138/93 |
| 3,800,833 | A | * | 4/1974 | Young | .......................... | 138/89 |
| 4,040,450 | A | * | 8/1977 | Boundy | ........................ | 138/94 |
| 4,111,233 | A |   | 9/1978 | Takashi | | |
| 5,520,219 | A | * | 5/1996 | Hessian | ....................... | 138/90 |
| 5,819,804 | A |   | 10/1998 | Ferrer et al. | | |
| 6,062,262 | A | * | 5/2000 | Tash | ............................ | 138/89 |

FOREIGN PATENT DOCUMENTS

| DE | 3718619 | * | 12/1988 |
| DE | 3910732 | * | 10/1990 |
| GB | 1231320 | * | 5/1971 |
| GB | 2 294 992 |  | 5/1996 |
| GB | 2 399 613 |  | 9/2004 |
| JP | 9079475 |  | 3/1997 |

* cited by examiner

*Primary Examiner*—James Hook  
(74) *Attorney, Agent, or Firm*—Aurthur Jacob

(57) ABSTRACT

An expandable pipe stopper for inserting within a pipe having two rigid circular plates adapted to be inserted wholly within a pipe and an outwardly-expandable flexible seal located between peripheral surfaces of the plates so as to be capable of expanding radially. A projection is rigidly secured to or integral with a first of the plates and extends slideably through an aperture defined by the second plate. The stopper also includes a lever pivotable about an axis through the projection and cam means rigidly secured to or integral with the lever such that the lever is pivotable between a first orientation in which the flexible seal is relatively undistorted and a second orientation in which the cam means force the plates towards each other so as to axially compress and radially expand the seal for engaging with sealing contact with the wall of a pipe. A member is rigidly secured to or integral with part of a remote peripheral surface of one of the plates. The member extends from the plate such that when the pipe stopper is located within a pipe it provides a reactive force to tilting of the pipe stopper from its operative position.

20 Claims, 22 Drawing Sheets

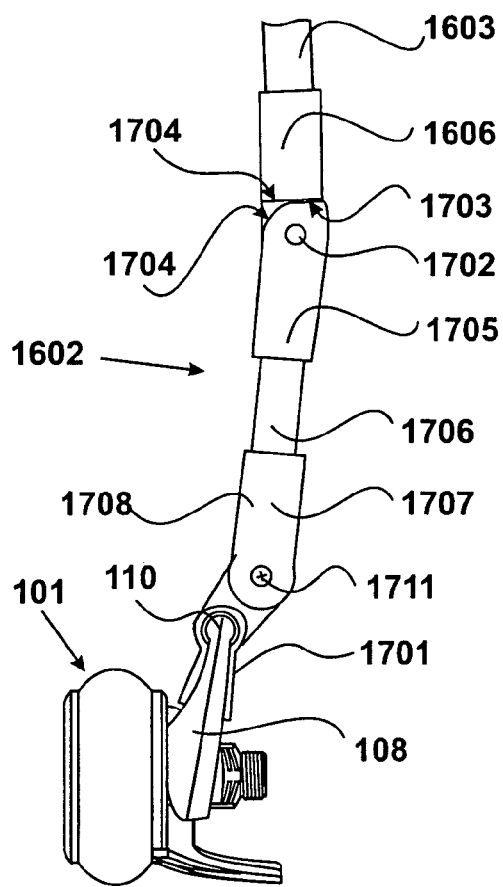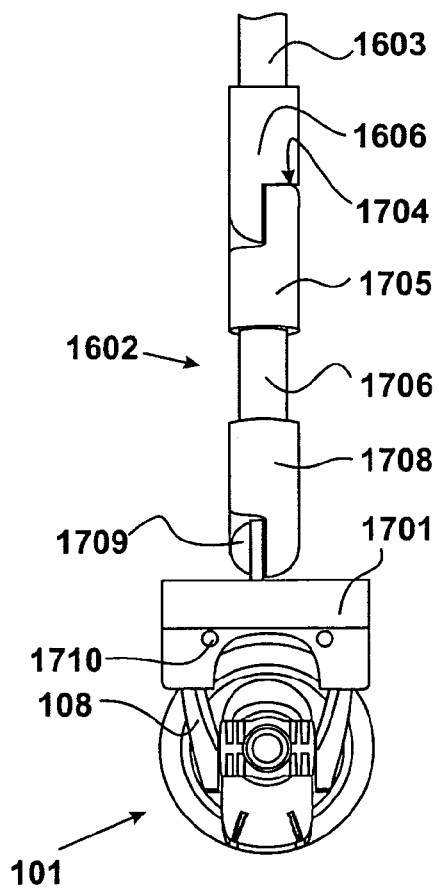
Fig. 17A
Fig. 17B

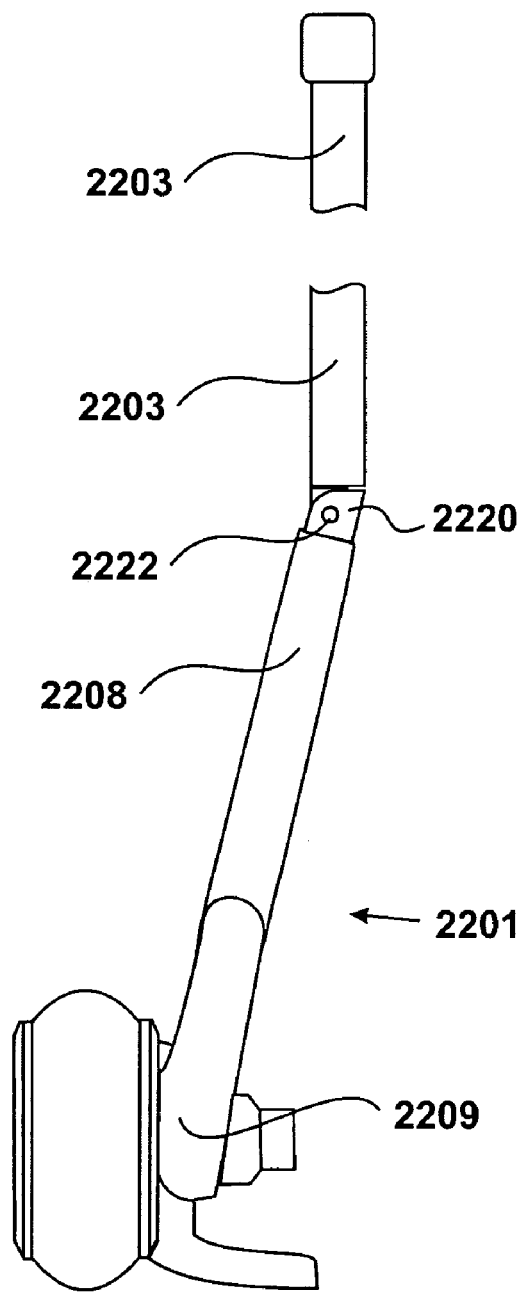
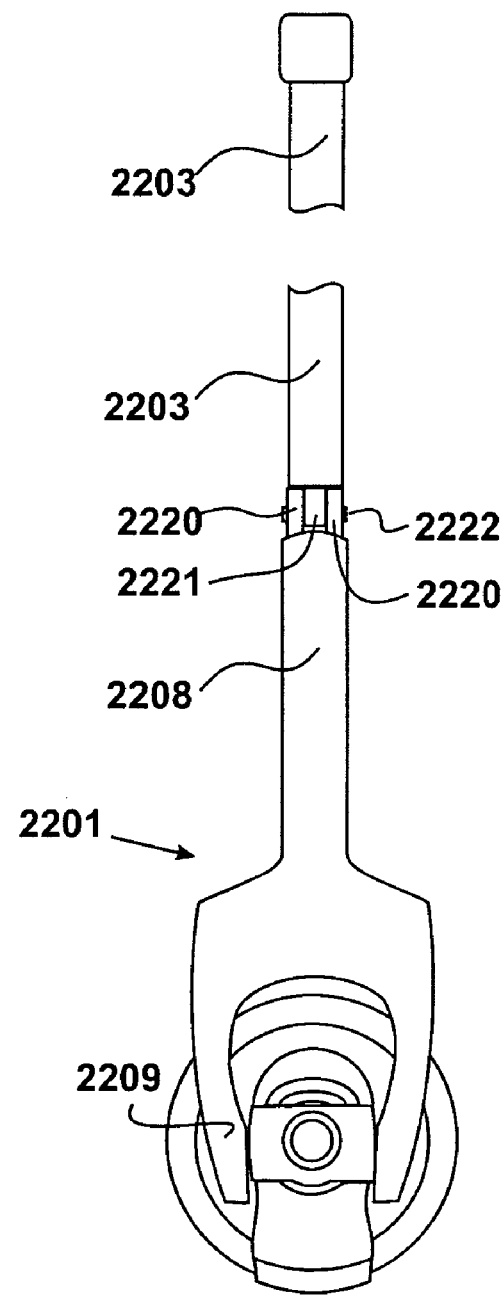
Fig. 22A
Fig. 22B

EXPANDABLE PIPE STOPPER

BACKGROUND OF THE INVENTION

1. Field of the Invention

The present invention relates to a pipe stopper for inserting within, and sealing, a pipe, and a remote installation device for installing an expandable pipe stopper.

2. Description of the Related Art

Pipe stoppers are known which include arrangements wherein co-axial plates are moved towards each other by cam means to squeeze one or more radially expandable seals disposed between them, the stoppers being axially elongated to ensure their stable positioning in the pipe.

Stoppers are also known which include arrangements wherein co-axial plates are moved towards each other by pivotable cam means to squeeze a radially outwardly expanding seal disposed between them into contact with a bore of a pipe, an annular wear plate in the form of a plane washer being interposed between the cam means and the adjacent one of said co-axial plates. The wear plate is the disposed on an externally screw threaded spigot that is fixed to the centre of one of said co-axial plates and passes through a central aperture in the other of said co-axial plates. The cam means are pivotally mounted on a collar having an internal screw thread by which the collar is positioned on the spigot. This known arrangement has the disadvantages of the cam means when operated tend to force the co-axial plates towards each other in a non-parallel manner; and also push the wear plate sideways into engagements with the screw threads on the spigots, causing jamming of the desired squeezing action of the cam means.

Pipe stoppers may be used in locations which are not easily accessed. For example, pipe stoppers are used for stopping pipes emerging into manholes in sewers. This may require a person inserting the pipe stopper to undertake specialist confined spaces training and take specified precautions to enter the manhole and insert the pipe stopper.

BRIEF SUMMARY OF THE INVENTION

According to a first aspect of the present invention there is provided a pipe stopper for inserting within a pipe comprising: two rigid circular plates; an outwardly-expandable flexible seal located between peripheral surfaces of the plates; a projection rigidly secured to or integral with a first of the plates and extending slideably through an aperture defined by the second plate; a lever pivotable about an axis through the projection; cam means rigidly secured to or integral with the lever such that said lever is pivotable between a first orientation in which the flexible seal is relatively undistorted and a second orientation in which the cam means force the plates towards each other so as to axially compress and radially expand the seal for engaging with sealing contact with a wall of a pipe; and a member rigidly secured to or integral with part of a remote peripheral surface of one of the plates, said member extending from the plate such that when the pipe stopper is located within a pipe said member provides a reactive force to tilting of the pipe stopper from its operative position.

Thus, the pipe stopper though not axially elongated can be stably secured in its operative position.

According to a second aspect of the present invention, there is provided an expandable pipe stopper for inserting within a pipe comprising: two rigid co-axial circular plates; an outwardly-expandable annular flexible seal located between adjacent peripheral surfaces of the plates; a projection rigidly secured to or integral with a first one of said plates and extending slideably through an aperture defined by the second one of said plates; a collar connected to the projection; a lever pivotally mounted on the collar; and cam means fixed to the lever; wherein said lever is pivotable between a first position in which the flexible seal is relatively undistorted and a second position in which the cam means force the plates relatively towards each other so as to compress the seal causing it to radially expand, and said lever is pivotable about an axis through the collar such that said axis is offset from the centre-line of the projection.

In a third aspect of the present invention there is provided a pipe stopper comprising: a pair of co-axial plates; a flexible seal located between the plates, said seal being configured to radially expand for sealing a pipe; a cam configured to act on one of the plates to bring said plates together to radially expand the flexible seal; and a pivotally mounted lever rigidly attached to or integral with said cam; and an elongate handle pivotally attached to said lever at a position remote from said cam, such that said lever is operable by applying a force along said handle.

In a fourth aspect of the present invention there is provided a remote installation device for an expandable pipe stopper comprising: an arm configured to be rigidly attached to a lever of a pipe stopper; an elongate handle connected to said arm by a hinging mechanism; and a stopping means which prevents the angle between the handle and the member increasing beyond a predetermined value.

In a fifth aspect of the present invention there is provided a conversion kit for an expandable pipe stopper for inserting within a pipe comprising: a collar having a screw-threaded hole configured to be connected to a screw-threaded projection on a pipe stopper; a lever pivotally mounted on the collar such that it is pivotable about an axis through the collar; cam means fixed to the lever; and a wear plate defining an aperture configured to fit around the projection of a pipe stopper, wherein said lever is pivotable between a first position and a second position in which the cam means applies force to the wear plate to radially expand the flexible seal, and said lever defines a aperture remote from said axis through the collar, said aperture being configured to receive a rope for pulling the lever from said second position to said first position.

BRIEF DESCRIPTION OF THE SEVERAL VIEWS OF THE DRAWINGS

FIGS. 17A and 17B provide a side view and rear view of the lower parts of the remote installation device 1601 and the pipe stopper 101;

FIGS. 22A and 22B show a side view and a rear view of an alternative pipe stopper 2201.

BEST MODE FOR CARRYING OUT THE INVENTION

Figure 1:
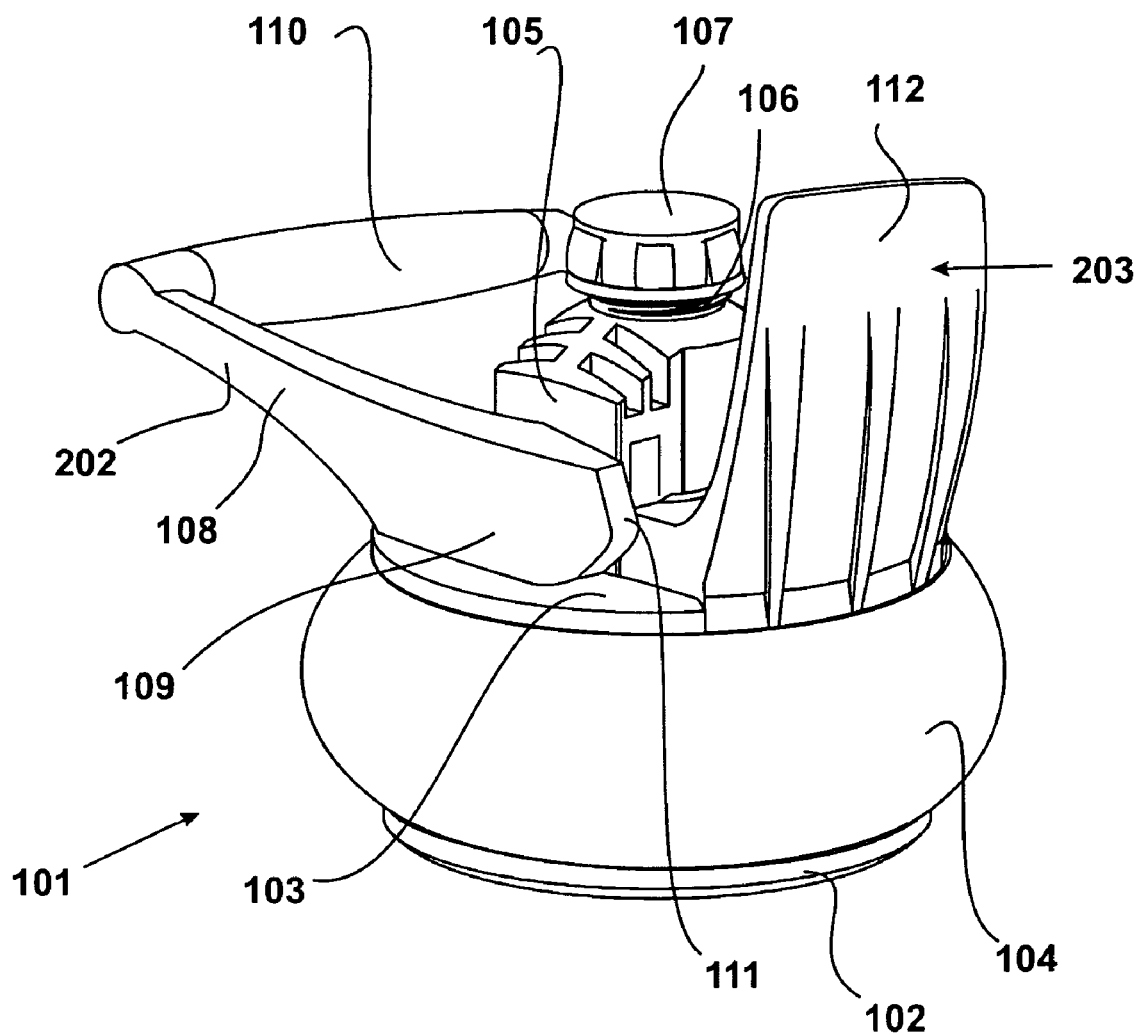
FIG. 1 shows a perspective view of a pipe stopper 101 configured to be inserted within, and to seal, a pipe.
Figure 2:
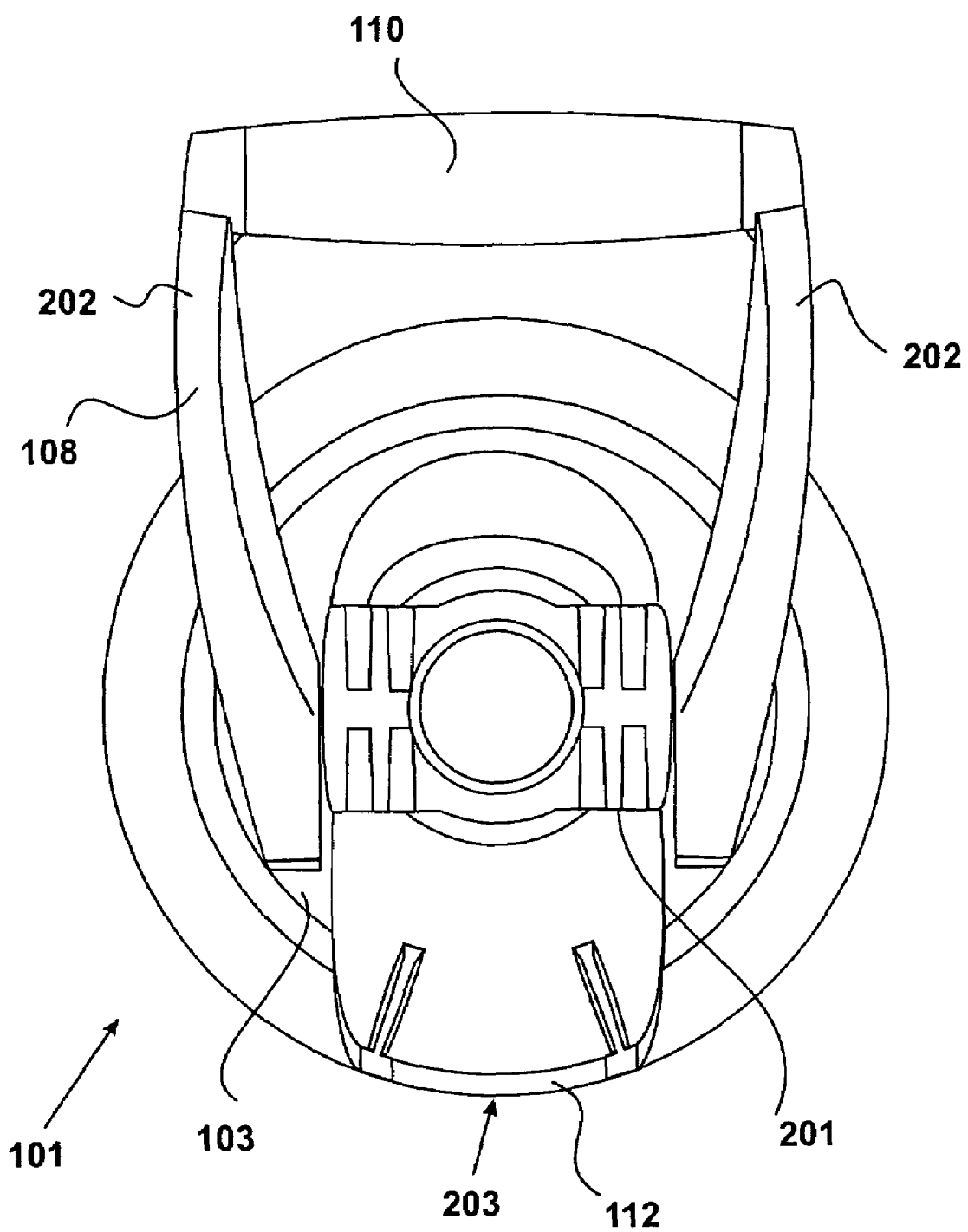
FIG. 2 shows plan view of the stopper of FIG. 1.

FIGS. 1 and 2

A perspective view of a pipe stopper 101 configured to be inserted within, and to seal, a pipe is provided by FIG. 1, while FIG. 2 provides a plan view of the stopper 101. The stopper 101 includes two rigid co-axial plates, a front plate 102 and a rear plate 103, of substantially the same diameter and an outwardly expandable annular flexible seal 104 positioned between adjacent peripheral surfaces of the plates 102 and 103. A single central axially-directed projection 105 extends from the plate 102 to which it is rigidly attached. The projection extends slideably through an aligned central aperture in plate 103. The projection 105 has an outer wall 201 that is non-cylindrical in shape and the aperture is shaped to provide a close sliding fit around said wall. Due to the non-cylindrical shape of the projection, it is unable to rotate within the aperture, and therefore provides a means of preventing relative rotation of the two plates 102 and 103.

The projection 105 has an axial bore (indicated by dashed lines 306 in FIG. 3) and a screw-threaded end 106 remote from the plate 102 to allow the connection of a nipple (not shown) to enable pressure-testing of a pipe to be effected, or an end cap 107 to effect sealing.

A bifurcated lever 108 is pivotally mounted on the projection 105, such that it is pivotal about an axis passing through the projection perpendicular to its direction of extension from plate 102. The lever has a pair of arms 202 each of which have cam parts 109 at one end and a handle 110 which connects the arms 202 at their other end. The lever 108 is shown in a first position in which the cam exerts little pressure on the rear plate 103 and consequently the flexible seal 104 is not deformed. The lever is pivotable to a second position such that a different part of a cam surface 111 on the cam portions 109 acts upon the plate 103 to force the two plates closer together thereby compressing the flexible seal 104 such that it expands radially.

The stopper 101 also includes a contacting member 112 that is rigidly secured to a peripheral surface of the rear plate 103. The contacting member extends upwards from the plane of the rear plate 103 away from the front plate 102, and has a curved outer surface 203 which has a radius of curvature of substantially the same diameter as a pipe diameter which the stopper is configured to seal.

Figure 3:
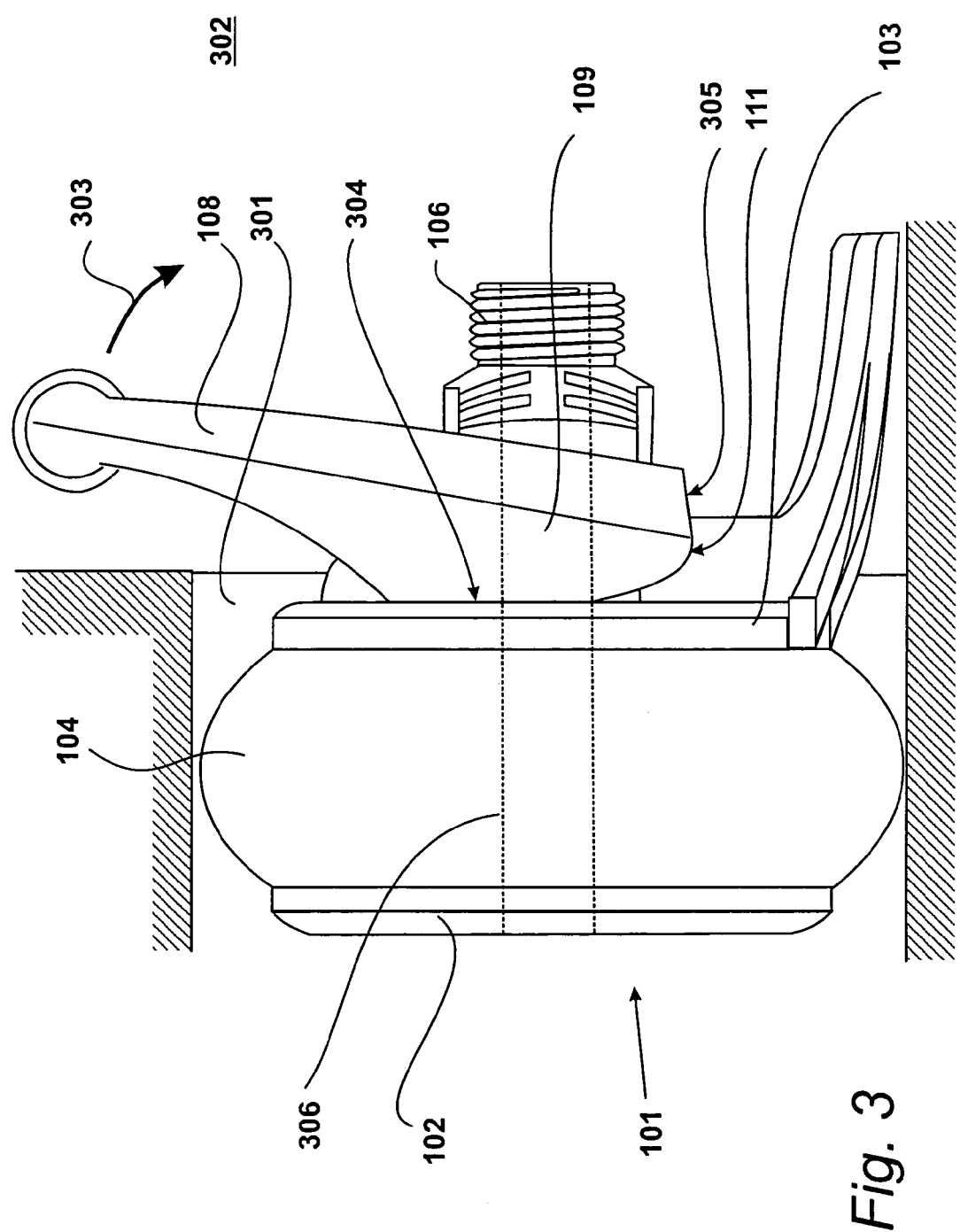
FIG. 3 shows the pipe stopper 101 inserted within a pipe 301.
Figure 4:
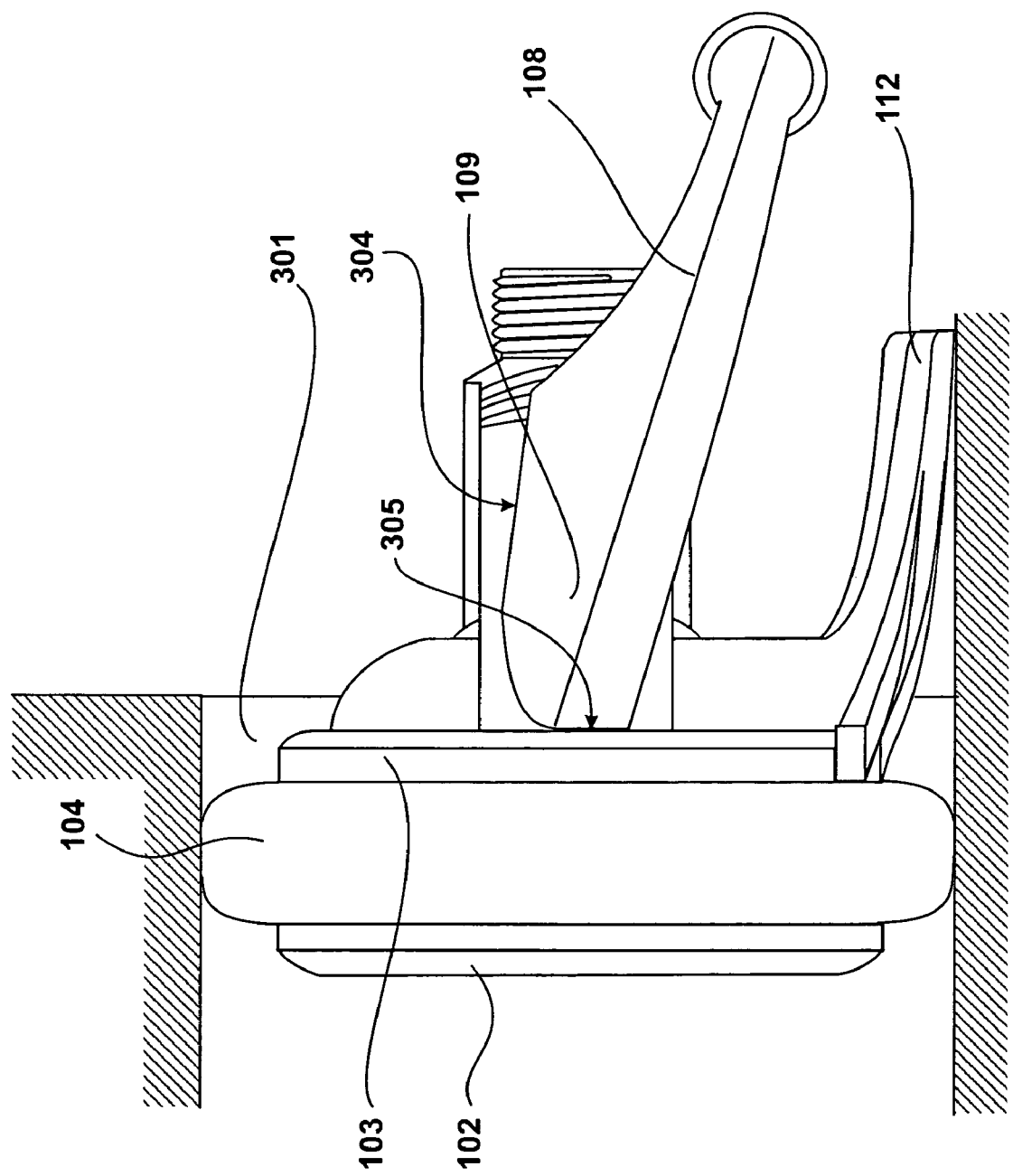
FIG. 4 shows the pipe stopper 101 with its lever 108 in the second position to seal the pipe.

FIGS. 3 and 4

The operation of the pipe stopper 101 is illustrated by FIGS. 3 and 4. FIG. 3 shows the pipe stopper inserted within a pipe 301, without its screw-cap 107 fitted.

The pipe in this example has an internal diameter of four inches, and the pipe stopper is dimensioned to fit with this size of pipe. However, it should be understood that other sizes of the pipe stopper are configured to fit other diameters of pipes. Typically, the end of pipe 301 is in communication with a manhole 302 in a sewerage system.

The pipe stopper is manually positioned within the end of pipe 301 while the lever 108 is in the first orientation, such that a first portion 304 of cam surface 111 is in contact with the rear plate 103. Consequently, cam portions 109 are applying little pressure to plate 103, the flexible seal 104 is not radially expanded and the stopper 101 can be easily positioned.

Having positioned the pipe stopper 101 in the pipe with the plates 102 and 103 perpendicular to the pipe's bore, the lever 108 is then manually rotated in direction of arrow 303 to bring the lever 108 to a second position such that a second portion 305 of the cam surface 111 contacts the rear plate 103.

The pipe stopper 101 is shown in FIG. 4 with the lever 108 in the second position. The cam portions 109 are configured such that the distance between the second portion 305 of the cam surface 111 to the pivot axis of the lever is larger than the distance between the first portion 304 to the pivot axis. Consequently, the cam 109 pushes against plate 103 bringing it closer to plate 102, thereby axially compressing and radially expanding the flexible seal 104. The flexible seal expands until it meets the wall of the pipe 301 and forms a seal.

During rotation of the lever 109 to seal the pipe 301, the pipe stopper tends to tilt out of position such that the plates are no longer perpendicular to the bore of the pipe. However, the contacting member 112 tends to be brought into contact with the pipe's inner surface, such that the pipe acts on the contacting member 112 to stop the tilting. Thus, the contacting member 112 provides a reactive force to tilting of the pipe stopper during the pipe sealing process.

It has also been found that failure of previous pipe stoppers occurs when minor leakage at the weakest point causes the stopper to tilt, and that the provision of the contact member 112 increases the resisting of tilting in these circumstances, so as to render the stopper capable of withstanding up to twice the pressure than conventional stoppers.

FIG. 5

Figure 5:
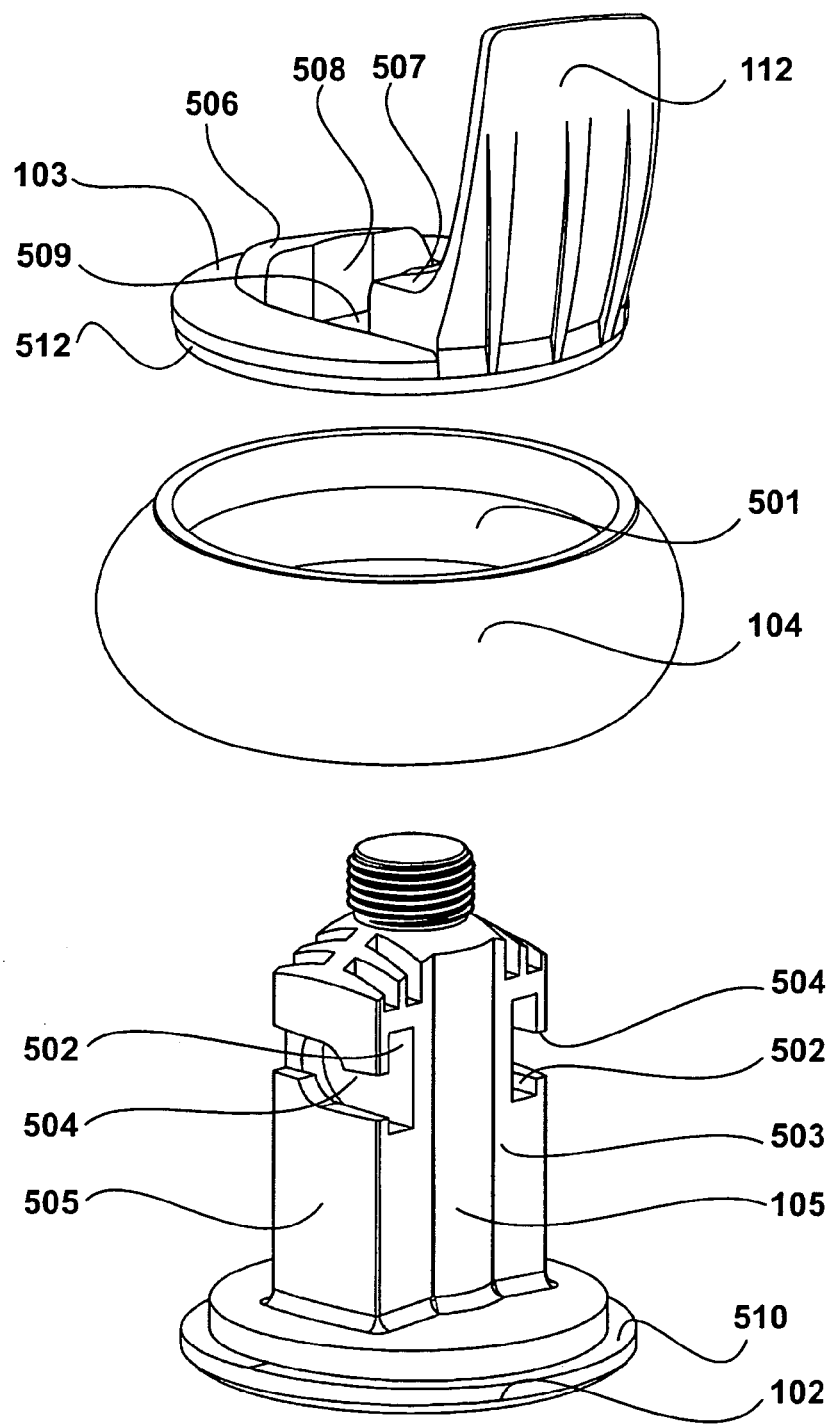
FIG. 5 shows three of the main components of the pipe stopper 101 of FIG. 1.
Figure 6:
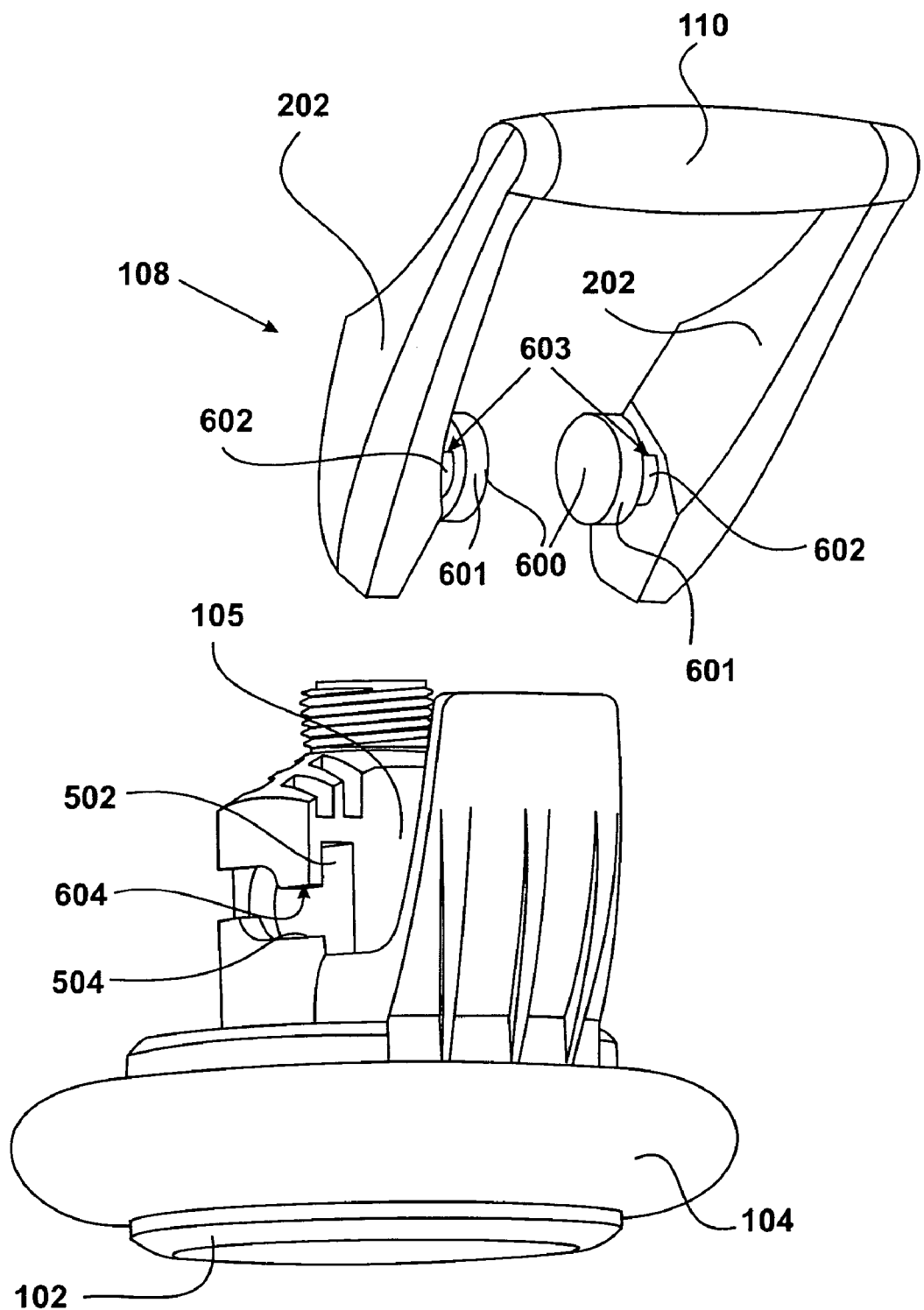
FIG. 6 shows the pipe stopper 101 partially assembled.
Figure 7:
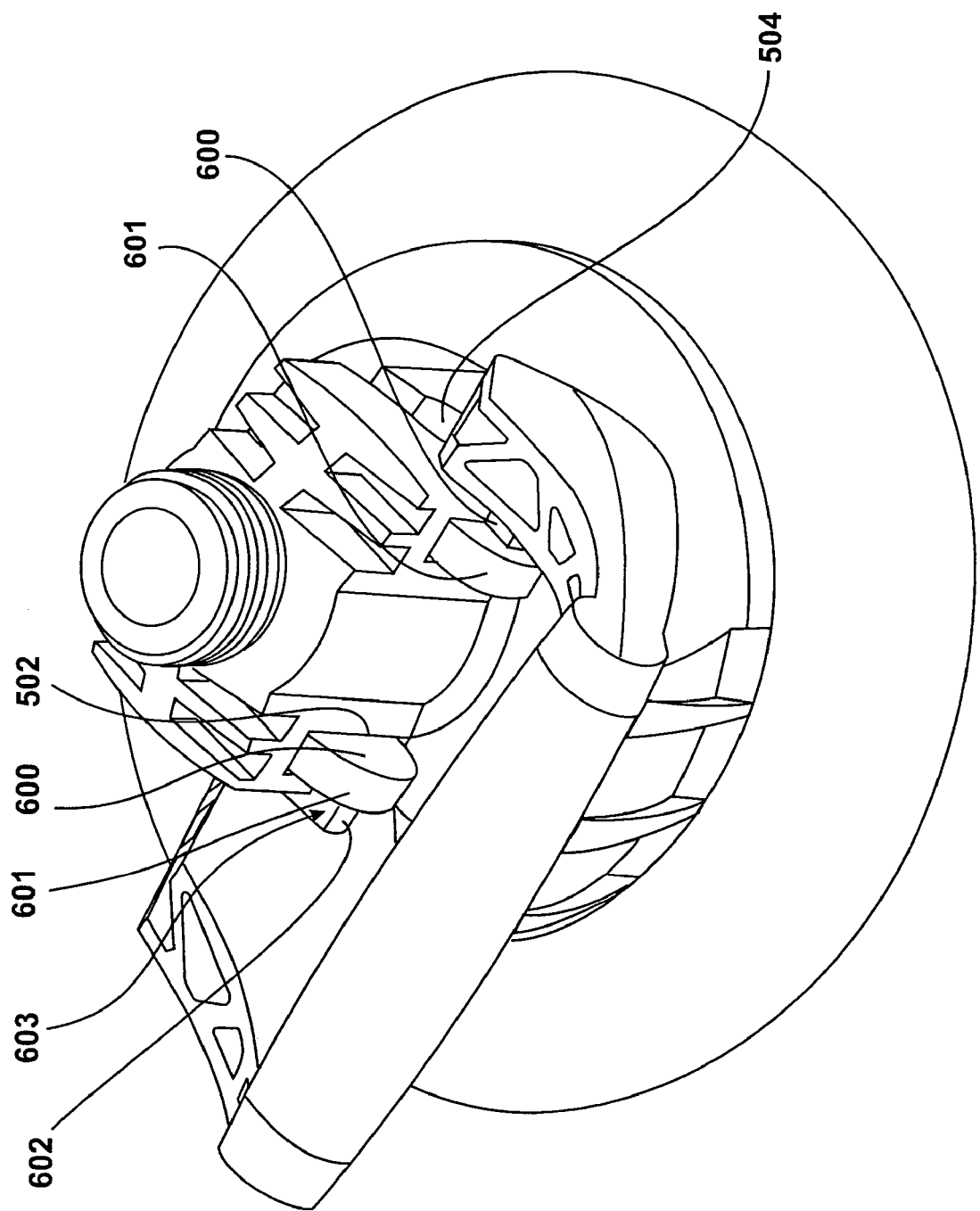
FIG. 7 shows the pipe stopper 101 with the heads 601 of pivot pins 600 partially inserted into recesses 502 and the eccentric portions 602 partially inserted into the cranked slots.

The method of manufacture and further features of the pipe stopper 101 are illustrated by FIGS. 5 to 7. Three of the main components of the pipe stopper 101 of FIG. 1 are shown in FIG. 5. The projection 105 and the front plate 102 are moulded as a single unit in a rigid plastics material, such as nylon, that is suitable for use in a sewerage system. The rear plate 103 and the contacting member 112 are also moulded as a single unit, from the same material. The flexible seal 104 is a ring moulded from rubber, or other similarly flexible and resilient material, such as a silicone rubber. The inner surface 501 of the seal 104 has a concave shape facilitating the radial expansion when axially compressed.

The projection 105 has two similar recesses 502 extending from one of its faces 503. Each of two opposing faces 505 of the projection 105 define a cranked slot 504 which communicates with a respective one on the recesses. The recesses and slots are configured to receive pivot pins of the lever as will be later described.

The plate 103 has raised portions 506 and 507 on opposing sides of the aperture 509. The raised portions 506 and 507 provide an extended wall 508 to face the projection 105 when the stopper is assembled. Thus the raised portions acting on the projection resist a relative movement between the plates 102 and 103 that would cause them to become non-parallel.

The plate 102 has a seat 510 at its periphery, configured to receive one sides of the flexible seal 104, and plate 103 has a similar seat 512 at its periphery, configured to receive the other side of said seal.

The first step in the assembly process is to bring the three components shown in FIG. 5 together, for instance by positioning the seal 104 on the seat 510 of plate 102, sliding projection 105 through the aperture 509 of plate 103 until the seal 104 is positioned on seat 512.

FIG. 6

The pipe stopper 101 is shown partially assembled in FIG. 6. The next step in the manufacture of the pipe stopper is to mount the lever 108 on the projection 105. A pivot pin 600 extends inwardly from each arm 202 of the lever 108. The pivot pins have a relatively large cylindrical head 601 connected to the arm by an eccentric portion 602. The eccentric portion 602 has the shape of a cylinder, which is smaller than and co-axial with the head 601, but which has a flat side 603. The lever 108 and pivot pins 600 are moulded as a single unit from a rigid plastics material, such as nylon. In this example, the handle is provided with a rubber sleeve to assist manual manipulation.

Having brought the two plates 102 and 103 and the flexible seal together, as described with reference to FIG. 5, pressure is applied to plates 102 and 103 to force them together, such that raised portion 507 clears the recesses 502 in the projection 105, as shown in FIG. 6.

The heads 601 of pivot pins 600 are then located within a respective recess 502 such that the flat sides 603 are adjacent the upper edges 604 of the cranked slots 504.

FIG. 7

The pipe stopper 101 is shown in FIG. 7 with the heads 601 of pivot pins 600 partially inserted into recesses 502 and the eccentric portions 602 partially inserted into the cranked slots.

Due to the eccentricity of the eccentric portions 602 caused by their flat surfaces 603, the lever 108 can only be mounted on the projection 105 in a particular, third, orientation. This third orientation is different to the first and second operational orientations and falls outside of the operative orientations of the lever 108.

To complete the process of locating the lever 108, the pivot pins 600 are pushed along the slots until their heads 601 come to the end of the recess 502. The lever 108 is then rotated round through the second operative orientation to the first operative orientation.

Fitting the plastic moulded screw-cap 107 then completes the assembly process to produce the pipe stopper as shown in FIG. 1.

FIG. 8

Figure 8C:
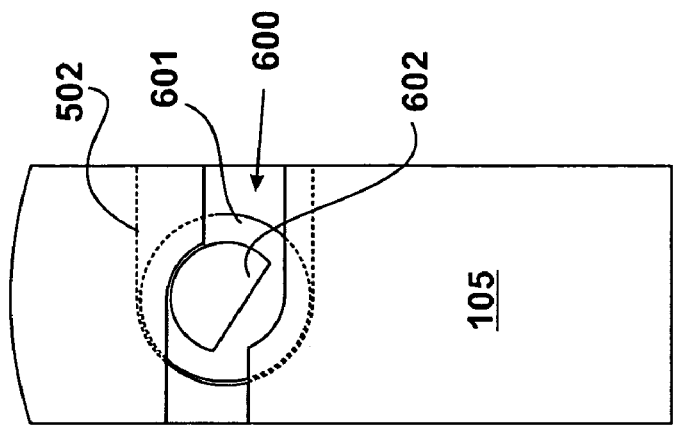
FIGS. 8A, 8B and 8C show a schematic representation of the projection 105 and the pivot pins illustrating the function of the eccentricity of the eccentric portion 602.
Figure 8B:
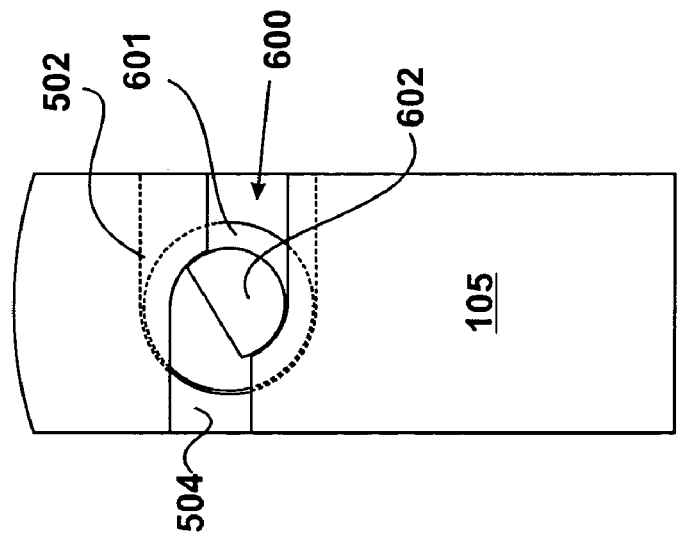
Figure 8A:
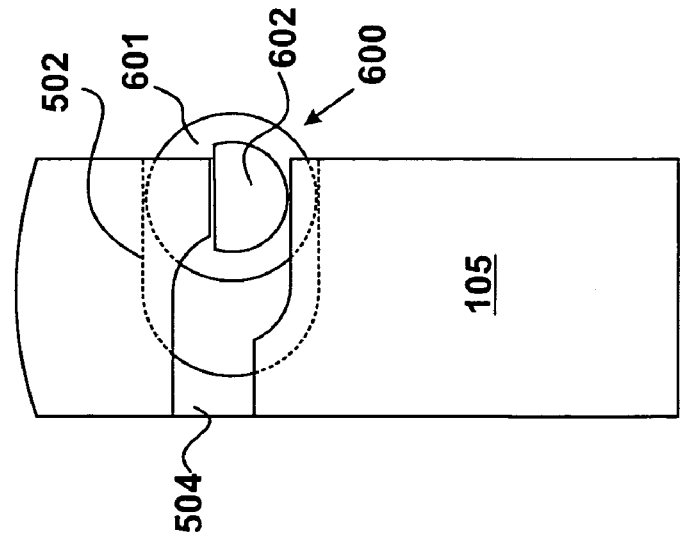

A schematic representation of the projection 105 and the pivot pins is provided in each of FIGS. 8A, 8B and 8C, which illustrate the function of the eccentricity of the eccentric portion 602. The pivot pin 600 is shown in the third orientation in FIG. 8A, such that the head 601 is able to slide through recess 502 while eccentric portion 602 is able to slide through cranked slot 504. The pivot pin 600 is shown in FIGS. 8B and 8C in the second orientation and first orientation respectively. In each of these two orientations and all orientations in between, the eccentric portion is able to pivot within a widened part of the cranked slot, but due to the eccentric nature of the eccentric portion it is unable to slide along said slot. Therefore, the eccentric portion in combination with the cranked slot provide a means of maintaining location of the pivot pins 600 within the projection 105.

FIG. 9

Figure 9:
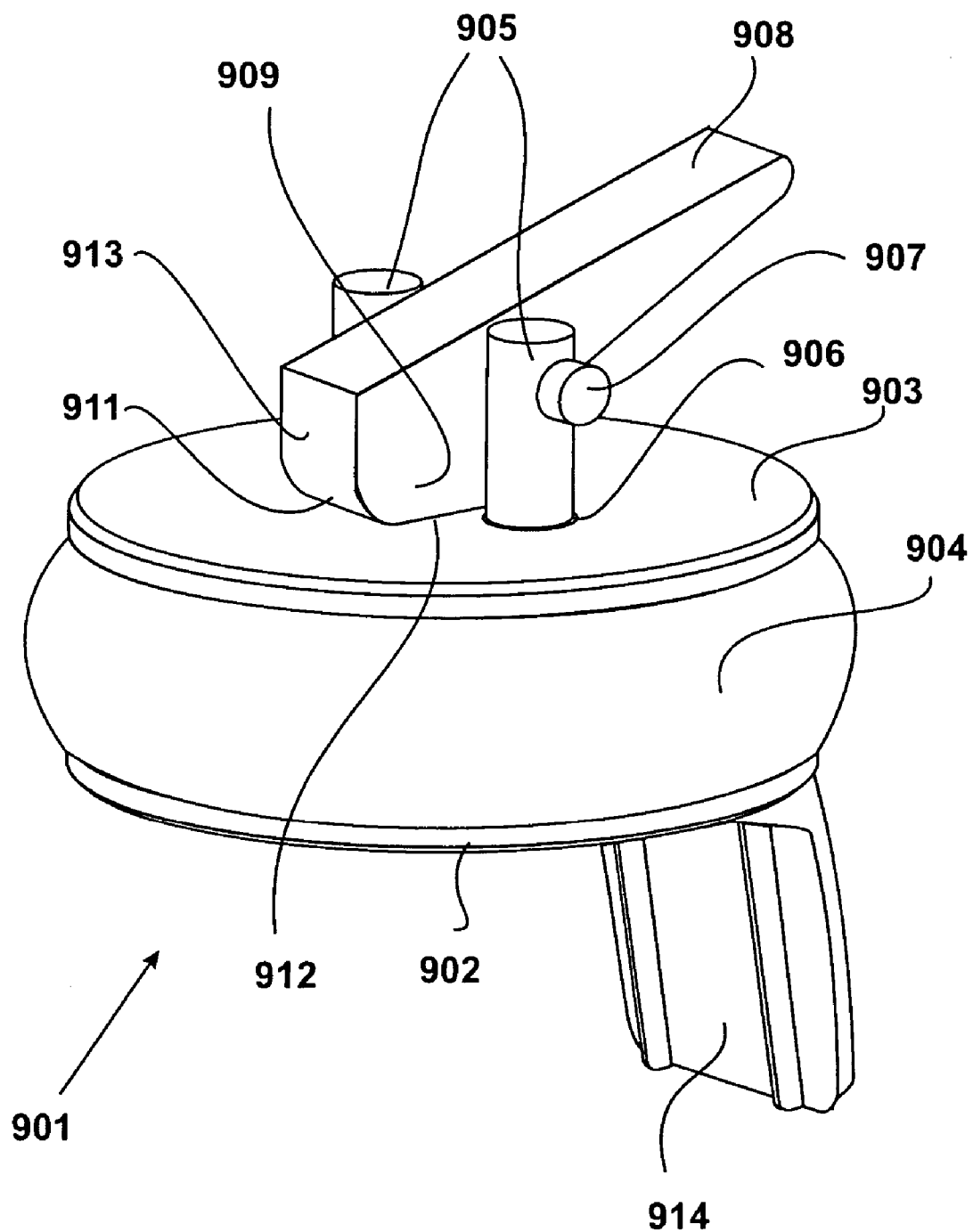
FIG. 9 shows an alternative pipe stopper 901.

An alternative pipe stopper 901 is shown in FIG. 9. Pipe stopper 901 is like pipe stopper 101 in that it has a pair of co-axial rigid plates 902 and 903, and a flexible seal 904 disposed between adjacent peripheral surfaces of the two plates.

A pair of projections 905 are rigidly attached to and extend perpendicularly from the plate 902, each passing through a respective aperture 906 defined by plate 903. A pivot pin 907 is securely fitted within aligned holes in the projections 905. The pivot pin 907 also passes through a lever 908 disposed between the two projections 905. The lever 908 has an integrally formed cam portion 909 defining a cam surface 911 which acts upon the plate 903. The cam surface has a first part 912 relatively near to the pivot pin 907 and a second part 913 relatively distance from the pivot pin. Consequently, the lever is pivotable from the first position, shown in FIG. 9 to a second position in which the cam surface second part 913 acts upon the plate 903 to bring the two plates closer together, and axially compress and radially expand the flexible seal 904.

Like the pipe stopper 101, pipe stopper 901 has a contacting member 914 which extends from one of the two plates, away from the other plate, but in the case of contacting member 914 it is mounted on the same plate as the projections. Thus, because it is not close to the lever 908 more space is provided for manual manipulation of the lever 908.

Both the pipe stopper 101 and pipe stopper 901 have a fixed distance between the front plate and the lever's pivot axis. Consequently, the degree of radial expansion of the flexible seal is controlled.

Figure 10:
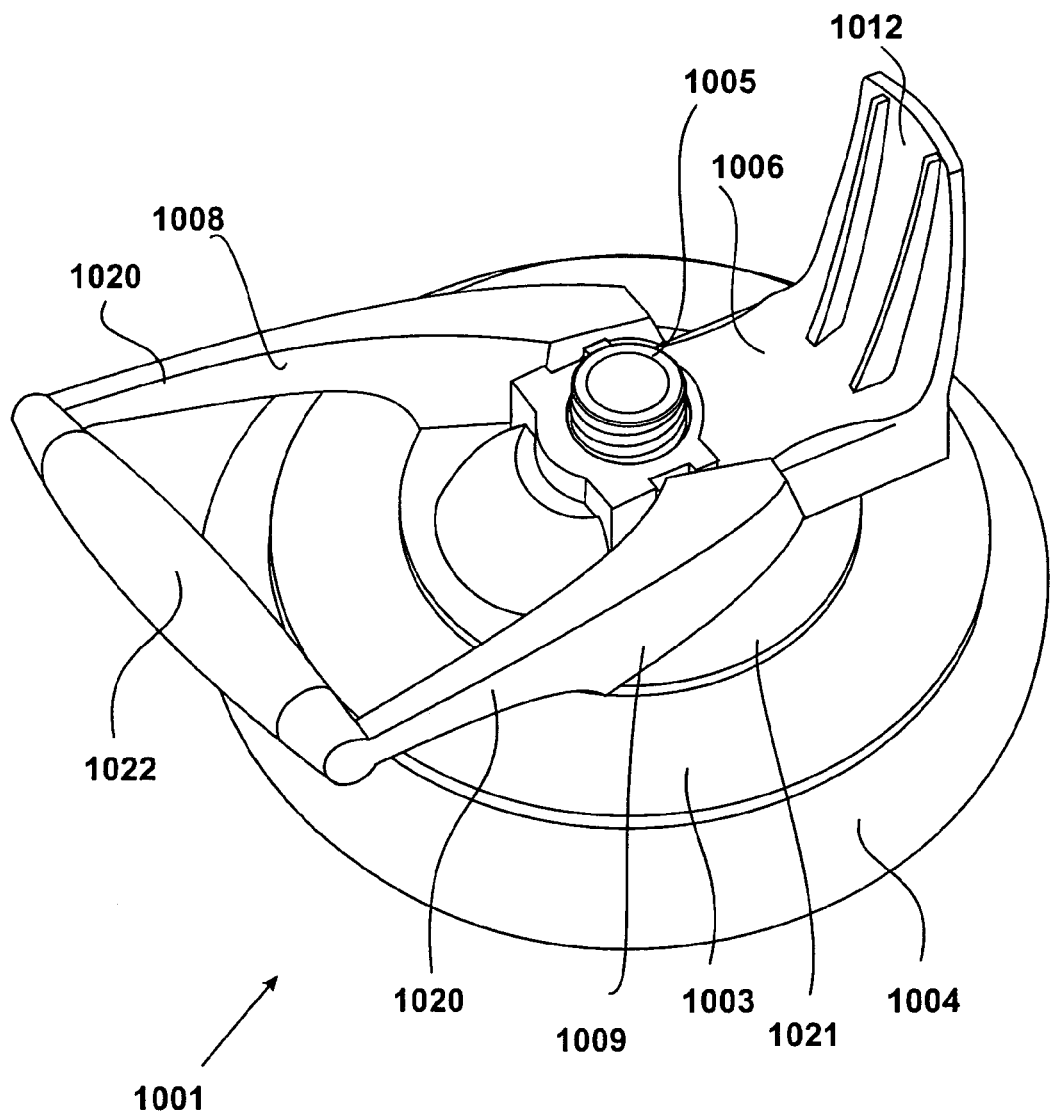
FIG. 10 shows a perspective view of another expandable pipe stopper 1001.
Figure 11:
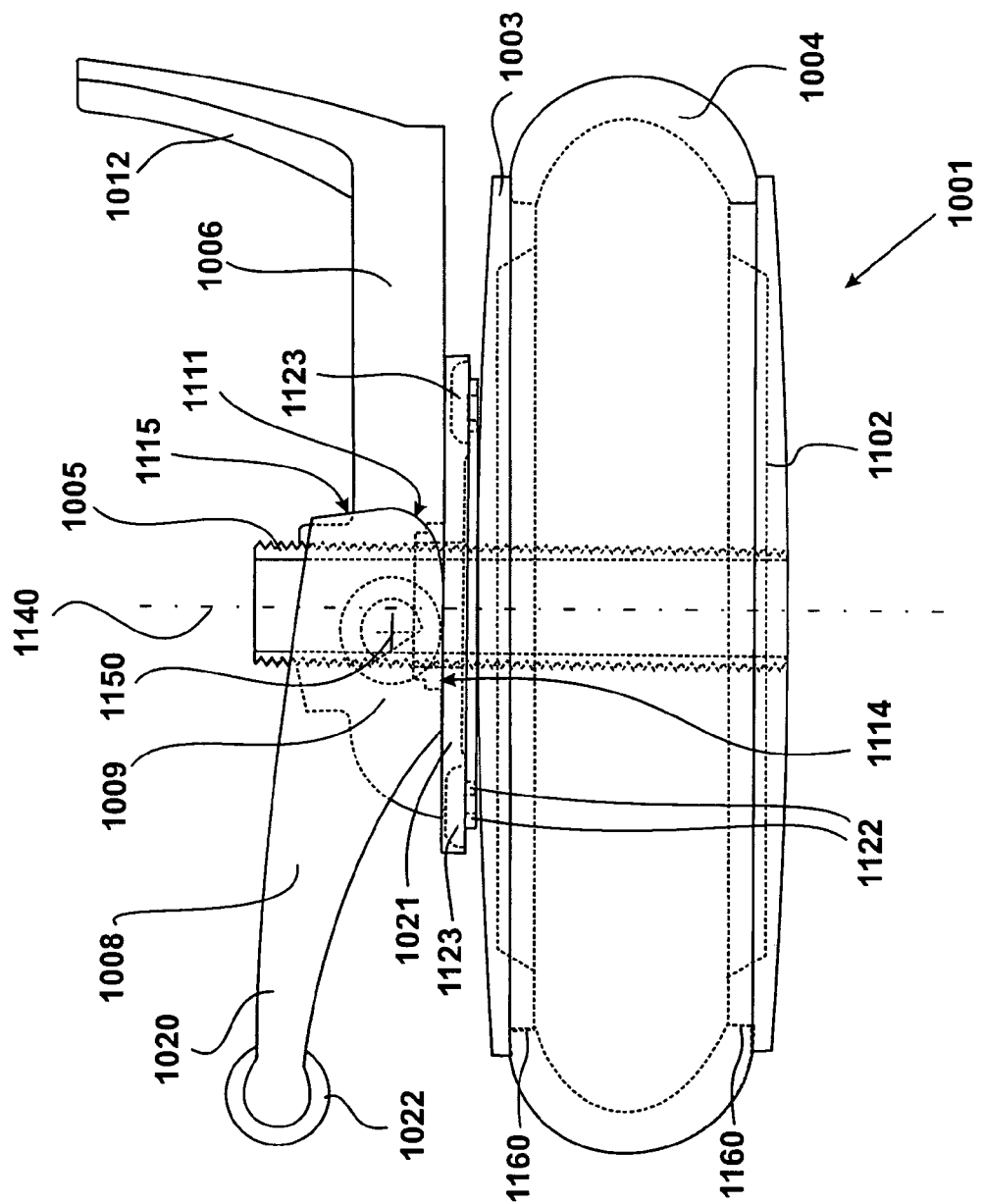
FIG. 11 shows a side view of the pipe stopper of FIG. 10 with its lever in a first position.
Figure 12:
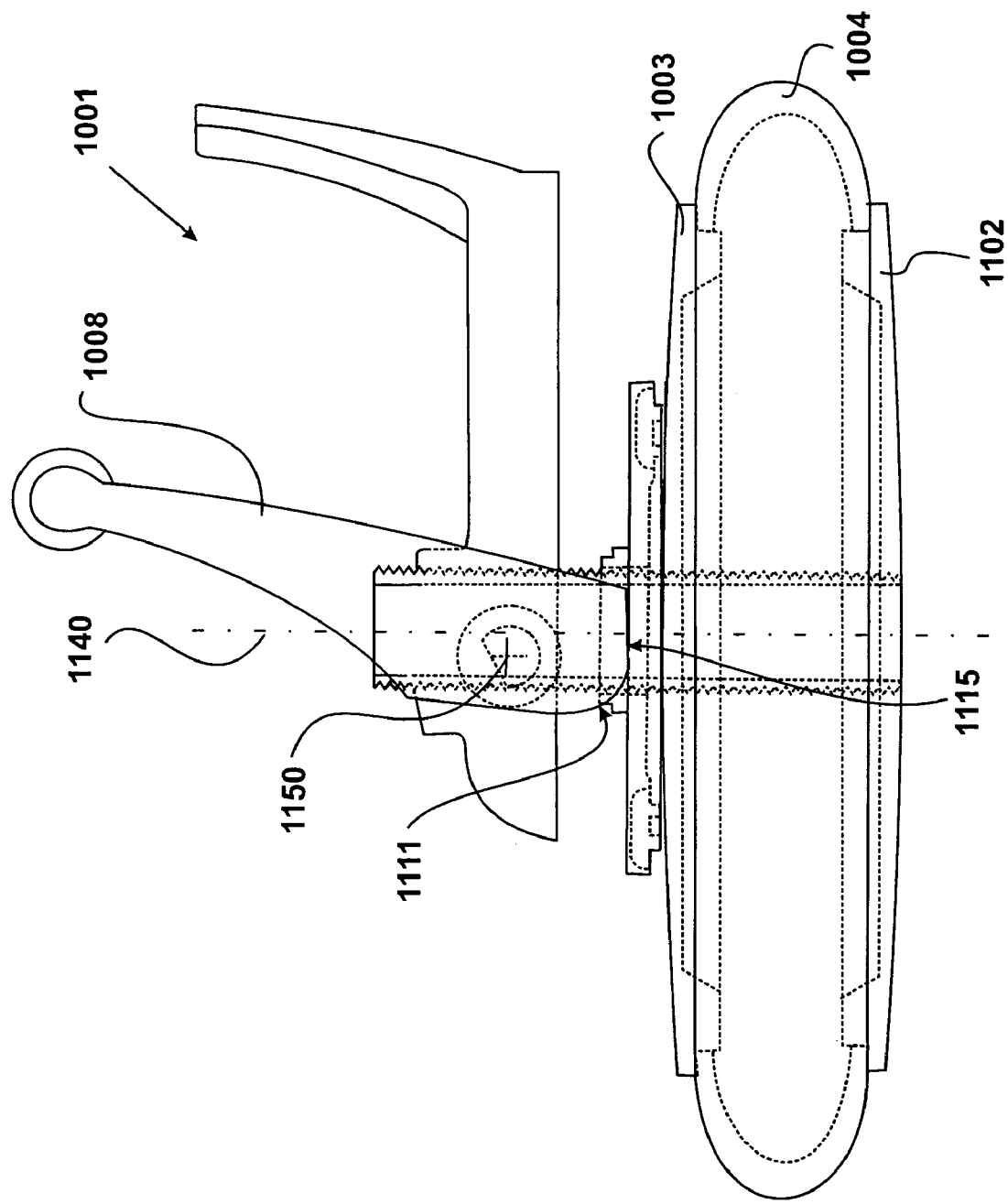
FIG. 12 provides a side view of the pipe stopper of FIG. 10 with its lever in a second position.

FIGS. 10, 11 and 12

A perspective view of another expandable pipe stopper 1001 is shown in FIG. 10, while side views of said stopper are shown in FIGS. 11 and 12. The pipe stopper 1001 includes a pair of rigid co-axial circular plates 1102 and 1003, having a centre line 1140. A projection 1005 is rigidly attached to, and extends axially from, a first of said plates 1102, and extends slideably through an aligned central aperture defined by the second of said plates 1003. A flexible seal 1004 is located between adjacent peripheral surfaces of the two plates 1003 and 1102. A step 1160 near the edge of each plate defines a seat to maintain the position of the seal 1004.

The projection has a screw-thread on its outer cylindrical surface and a bore providing communication between one side of the pipe stopper 1001 and the other. Thus in use, a screw-cap is applied to the end of the projection to seal it or a nipple may be screwed on for the purposes of performing pressure tests on a pipe.

The stopper 1001 also includes a collar 1006 having hole containing a screw-thread configured to mate with the thread of the projection. Thus, the collar 1006 is attached to the projection 1005 by said screw-threads, and its position along the projection is adjustable.

A contacting member 1012 is rigidly attached to the collar and extends from the collar away from the plates 1102 and 1003. Like the contacting member 112 of pipe stopper 101, contacting member 1012 is adapted to contact a bore of a pipe so as to provide a reactive force to tilting of the stopper out of its operative position perpendicular to the axis of the pipe.

A lever 1008 is pivotally mounted on the collar 1006 such that it pivots about an axis 1150 extending parallel with the plates 1003 and 1102. The lever 1008 is substantially the same as lever 108 of the cam stopper of FIG. 1, and, consequently, it has a bifurcated structure with a cam portion 1009 at one end of each of its arms 1020 and a handle 1022 at the opposite end. The cam portions 1009 define a cam surface 1111 having a first part 1114 that is relatively near to the axis 1150 of rotation of the lever, and a second part 1115 that is relatively distant from the axis.

The pipe stopper 1001 also includes a wear plate 1021 defining an aperture through which the projection 1005 passes; the wear plate being located between the collar 1006 and the rear plate 1003.

The manner of operation of the pipe stopper 1001 is similar to that of pipe stopper 101, except that the cam portions 1009 act upon the wear plate 1021 which consequently acts upon the rear plate 1003. Thus, when the lever is in a first orientation as shown in FIG. 11, the cam portions apply relatively little pressure to the cam plate 1021. When the lever 1008 is rotated to a second orientation, such that the second part 1115 of cam surface 1111 acts upon the wear plate 1021, the wear plate is forced away from the collar and forces the plates 1102 and 1003 closer together, thereby axially compressing, and radially expanding, the flexible seal 1004.

The pipe stopper 1001 is shown with the lever 1008 in the second orientation and with the flexible seal 1004 radially expanded in FIG. 12. It will be understood that in use, when the pipe stopper is located in the end of a pipe the expanded flexible seal presses against the internal surface of the pipe to effect a seal.

When the lever 1008 is in the first orientation, as shown in FIG. 11, with relatively little pressure applied to the seal, the plates 1102 and 1003 are parallel. During operation, as the lever 1008 is rotated from the first position through to the second position, there is a generally increasing normal force applied by the cam portions 1009 on the wear plate 1021. This normal force moves forwards and then backwards over the wear plate as different parts of the cam surface 1111 act upon it. Furthermore, there is a corresponding frictional force between the cam surface and the wear plate which tends to drag the wear plate backwards as the lever is actuated. The combination of these forces tends to cause the rear plate 1003 to be moved such that it is no longer parallel with the front plate 1102. However, to avoid this effect, the axis 1150 of the pivot of the lever is offset from the centre-line 1140 of the plates. Due to the offset disposition of axis 1150 the action of the cam portions 1109 on the wear plates is applied generally closer to the centre-line 1140 of the wear plate 1021 than would be the case if the axis were not offset. Consequently, the plates remain parallel during lever actuation.

By way of example, on a pipe stopper configured for use in pipe diameter of six inches, the pivotal axis is offset from the centre-line by one eighth to three eighths of an inch (three millimetres to nine millimetres).

The pipe stopper 1001 may be produced from a conventional pipe stopper that has a nut for applying the pressure to the rear plate. To convert such a pipe stopper to the pipe stopper of FIG. 10, the nut is removed and replaced by the wear plate 1021, collar 1006 and lever 1008. Conventional pipe stoppers have a variety of surface configurations on their rear plate, and as shown in FIG. 11, the surface may be convex. The wear plate is provided with several concentric ridges 1122 on its surface facing the rear plate which allow the location of the wear plate to be stable even when the adjacent surface of the rear plate is convex. The concentric ridges also have the effect of increasing the friction between the wear plate and the rear plate and thereby resist sideways movement of the wear plate when the lever is actuated.

In addition, the wear plate 1021 is provided with a pair of recesses 1123 configured to mate with protrusions (not shown) on the surface of the rear plate 1003.

In an alternative embodiment to that of FIG. 10, the collar is rigidly secured to the projection.

In a further alternative embodiment to that of FIG. 10, the screw thread is omitted from the projection and the collar is secured to the projection by means of a pin selectively engageable in a diametrical hole in the collar and one of a series of axially spaced holes in the projection.

In another embodiment the wear plate is provided with diametrically-opposed projections for engagement with mating recesses in the rear plate 1003.

FIG. 13

Figure 13:
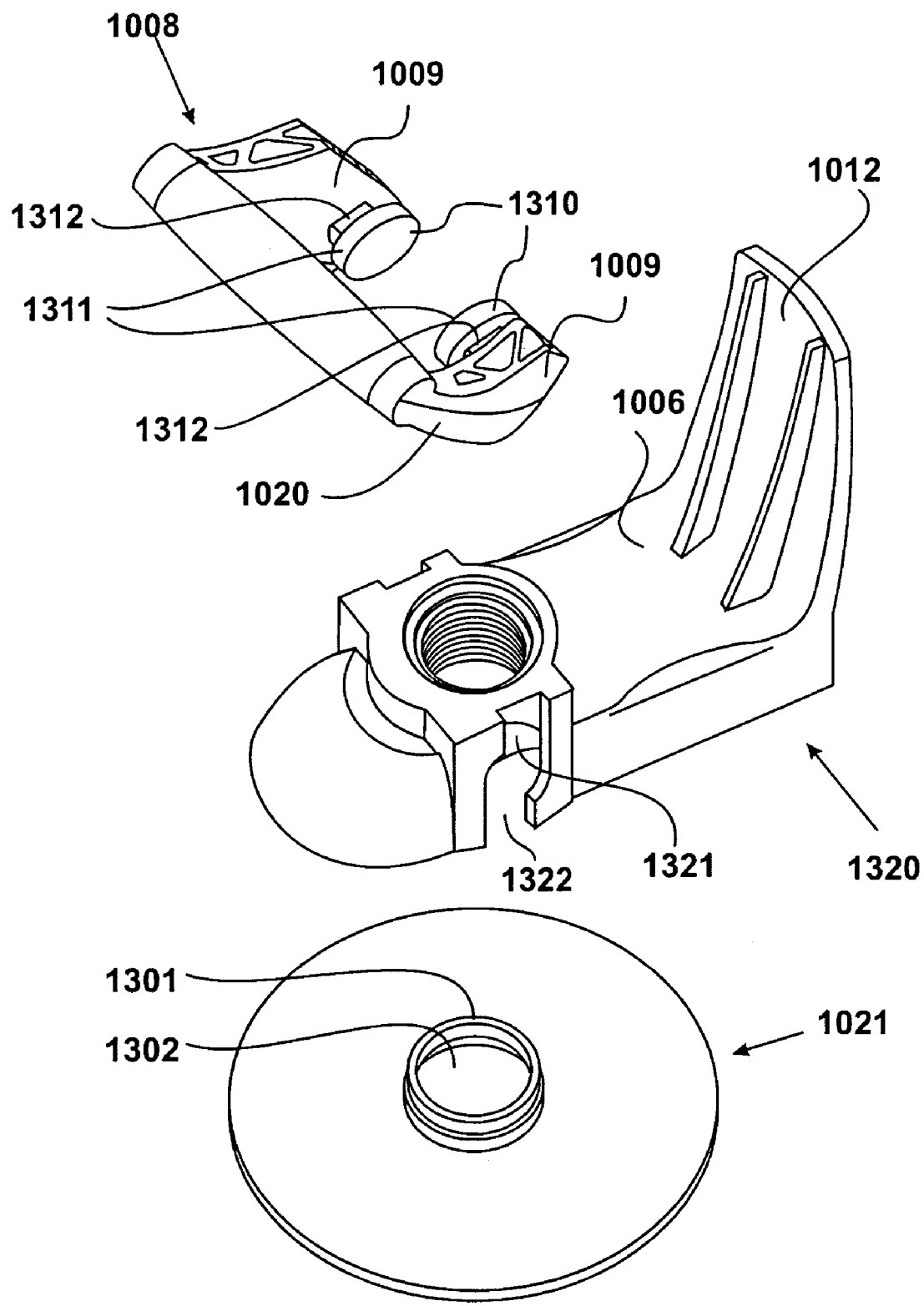
FIG. 13 shows the wear plate 1021, the lever 1008 and the collar 1006 from the pipe stopper of FIG. 10.

The wear plate 1021, the lever 1008 and the collar 1006 from the pipe stopper of FIG. 10, are shown separated in FIG. 13. The wear plate has a raised rim 1301 around its central aperture 1302 that is configured to fit closely within a recess (shown in FIG. 14) in the underside of the collar 1006. This provides a degree of resistance to the effects of the above mentioned frictional forces when the lever is first actuated. The internal wall of the wear plate 1021 which defines the aperture 1302 is of sufficient length so as to extend across several screw threads on the projection 1005. This prevents the wear plate engaging with the screw thread and causing jamming, in the event that the wear plate moves sideways during operation.

As mentioned above, the lever 1008 is substantially the same as lever 108 of pipe stopper 101. Thus lever 1008, cam portions 1009, and inwardly extending pivot pins 1310 are moulded as a single unit in a rigid plastics material, such as nylon. The pivot pins have a relatively large diameter cylindrical head 1311 connected to the arms 1020 of the lever by eccentric portions 1312. The eccentric portions being of a generally cylindrical shape with a flat side.

The collar is provided with a pair of recesses 1321 extending upwards from its underside and a respective pair of cranked slots 1322 which extend generally upwards along opposing side faces of the collar. The cranked slots 1322 communicate with the recesses 1321, and, like the recesses and cranked slot of the projection 105, they are configured to receive the heads 1311 and eccentric portions 1312 of pivot pins 1310. The cranked slots 1322 and recesses 1321 are also configured such that the lever 1008 has to be in a third, non-operational, orientation for the pivot pins to be inserted and then rotated through the second operational orientation to the first operational orientation before the collar is screwed onto the projection to produce the pipe stopper 1001 as shown in FIG. 10.

The collar 1006 and the contacting member 1012 are moulded as a single unit 1320, in a rigid plastics material, such as nylon.

FIG. 14

Figure 14:
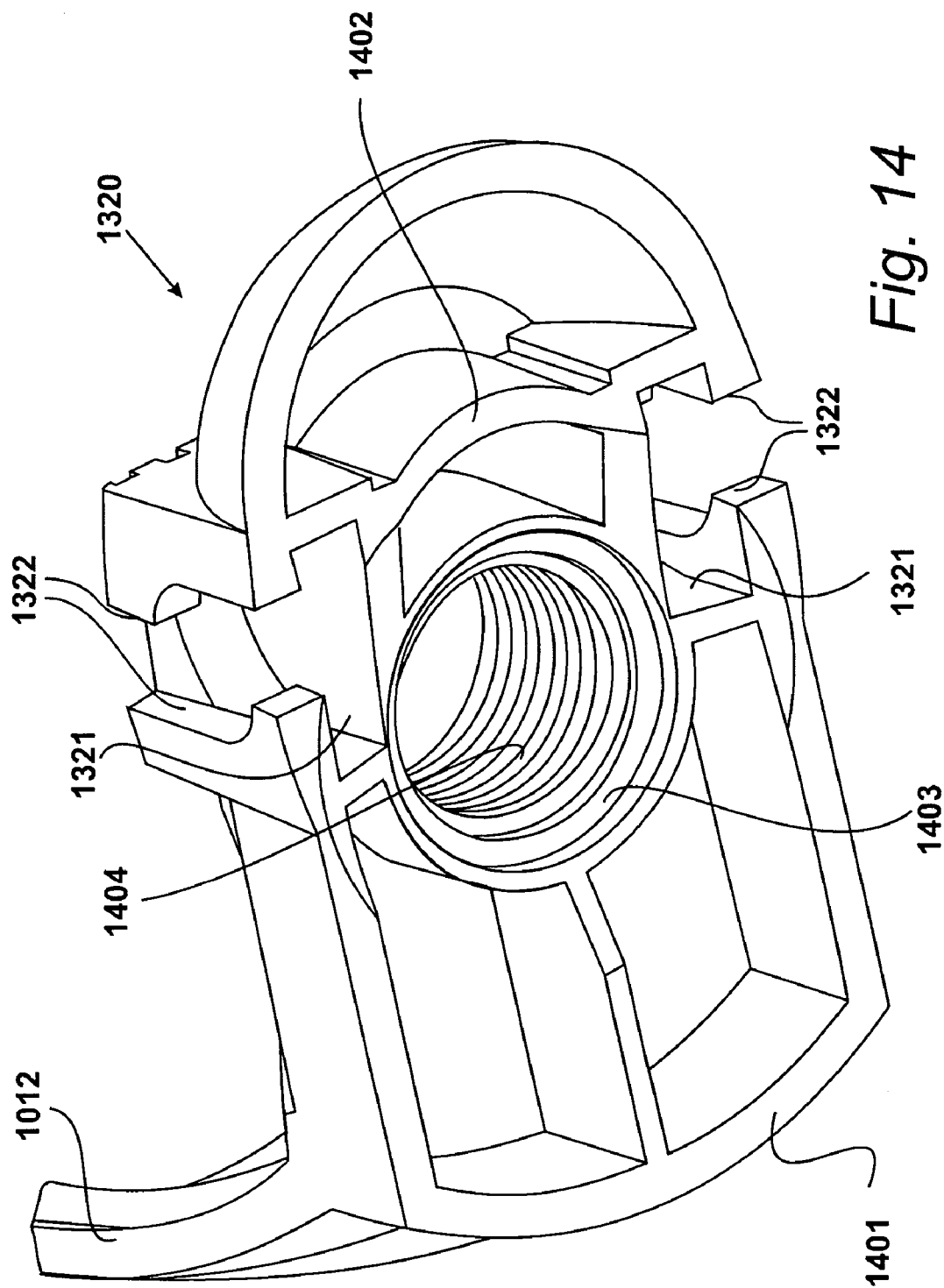
FIG. 14 provides a perspective view of the underside of the collar and contacting member unit 1320.

A perspective view of the underside of the collar and contacting member unit 1320 is shown in FIG. 14. The unit 1320 comprises an outer shell 1401 and a matrix of webbing 1402. During operation, the contacting member 1012 receives a reaction force from the pipe to prevent the pipe stopper from tilting. To perform this function effectively the unit 1320 must be sufficiently rigid such that it does not deform under the reaction force, otherwise the plates of the pipe stopper could tilt. It has been found that the matrix of webbing 1402 provides the nylon unit 1320 with the required rigidity.

The underside of the collar 1006 also defines a recess 1403 around the periphery of the threaded hole 1404 which is configured to receive the raised rim 1301 of the wear plate 1021.

In an alternative embodiment the collar and contacting member are separate elements which are rigidly secured together.

FIG. 15

Figure 15:
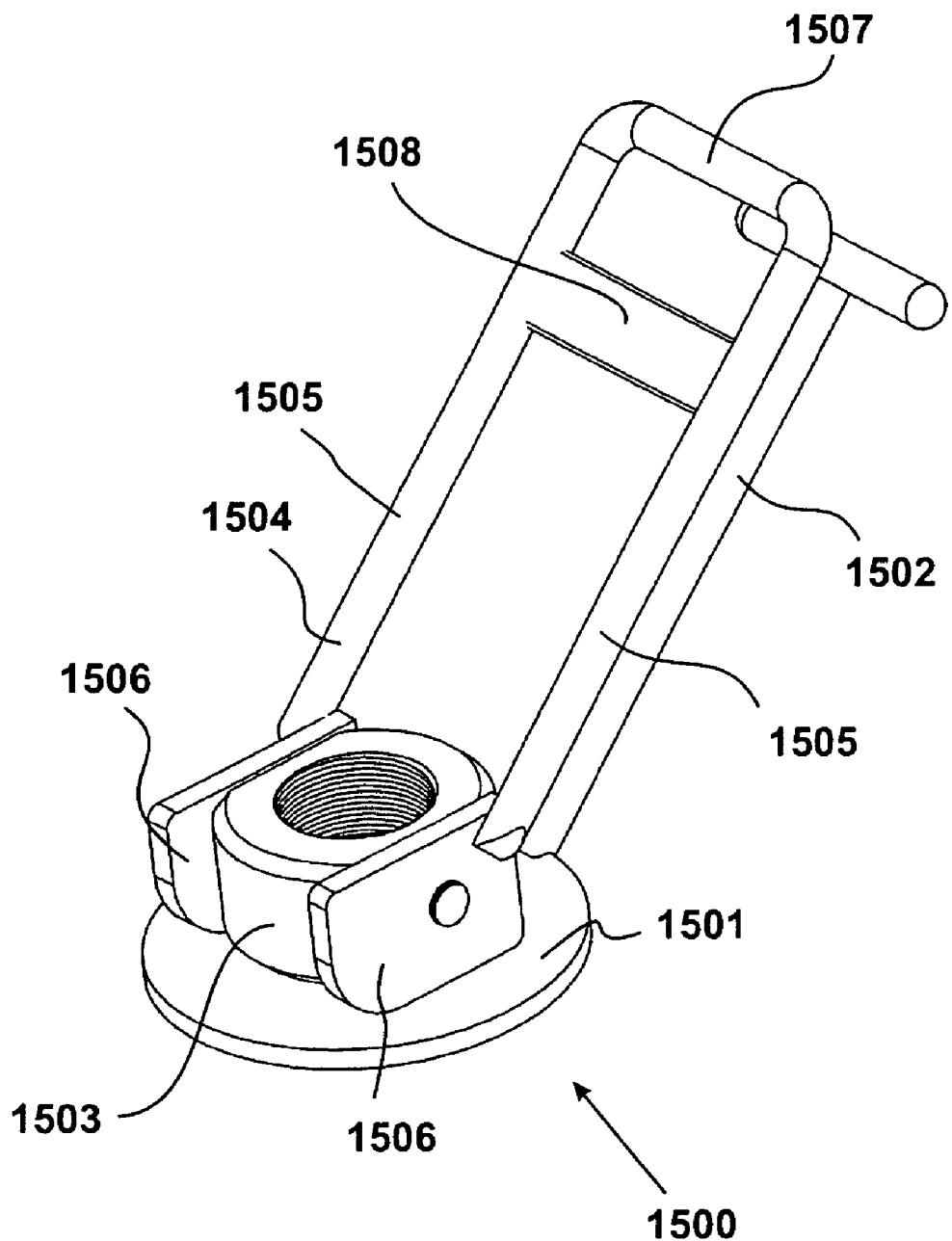
FIG. 15 shows an alternative conversion kit 1500 for an expandable pipe stopper.

An alternative conversion kit 1500 for an expandable pipe stopper is shown in FIG. 15. The kit includes a wear plate having a central circular aperture (not shown) and an elongate handle 1502 rigidly attached to the wear plate. The kit also includes a collar 1503 having a screw-threaded hole configured to mate with a screw-threaded projection on a conventional expandable pipe stopper. A lever 1504 comprising a pair of arms 1505 is rigidly attached at one end of each arm to a respective cam plate 1506, the cam plates being, in turn, pivotally attached to the collar 1503. The lever 1504 has a handle 1507 joining the ends of the arms remote from the cam plates, and a retaining member 1508 rigidly secured between the two arms parallel to the lever handle 1507.

To convert a conventional pipe stopper, the nut on the pipe stopper is removed, the threaded projection on the pipe stopper is passed through the central aperture of the wear plate 1501 and the collar is then screwed onto said projection.

The use and operation of a pipe stopper fitted with such a conversion kit is similar to those described above. Thus, typically the pipe to be stopped will have an end which is located within a manhole of a sewerage system. The pipe stopper is manually located within the end of a pipe and the lever actuated such that the cam means act on the wear plate which in turn acts on a rear plate of the pipe stopper. A flexible seal sandwiched between the rear plate and a front plate is consequently axially compressed causing it to radially expand against the wall of the pipe.

When the pipe stopper is to be removed from the pipe, it is preferable for the user to pass one end of a rope through the aperture formed by the handle 1507, the arms 1505 of the lever and the retaining member 1508, and to tie it to the handle. Then, climb out of the manhole with the other end of the rope. The rope can then be pulled, to de-activate the pipe stopper and remove it from the pipe. When the rope is pulled the angle of the rope relative to the arms 1505 is such that the rope has a tendency to ride up the arms towards the pivot. However, the retaining member 1508 ensures that the rope remains at the handle end of the lever 1504 so that the rope provides an effective turning force on the lever.

It should be noted that levers with retaining members could be used on the pipe stoppers of FIGS. 1 and 10.

FIG. 16

Figure 16:
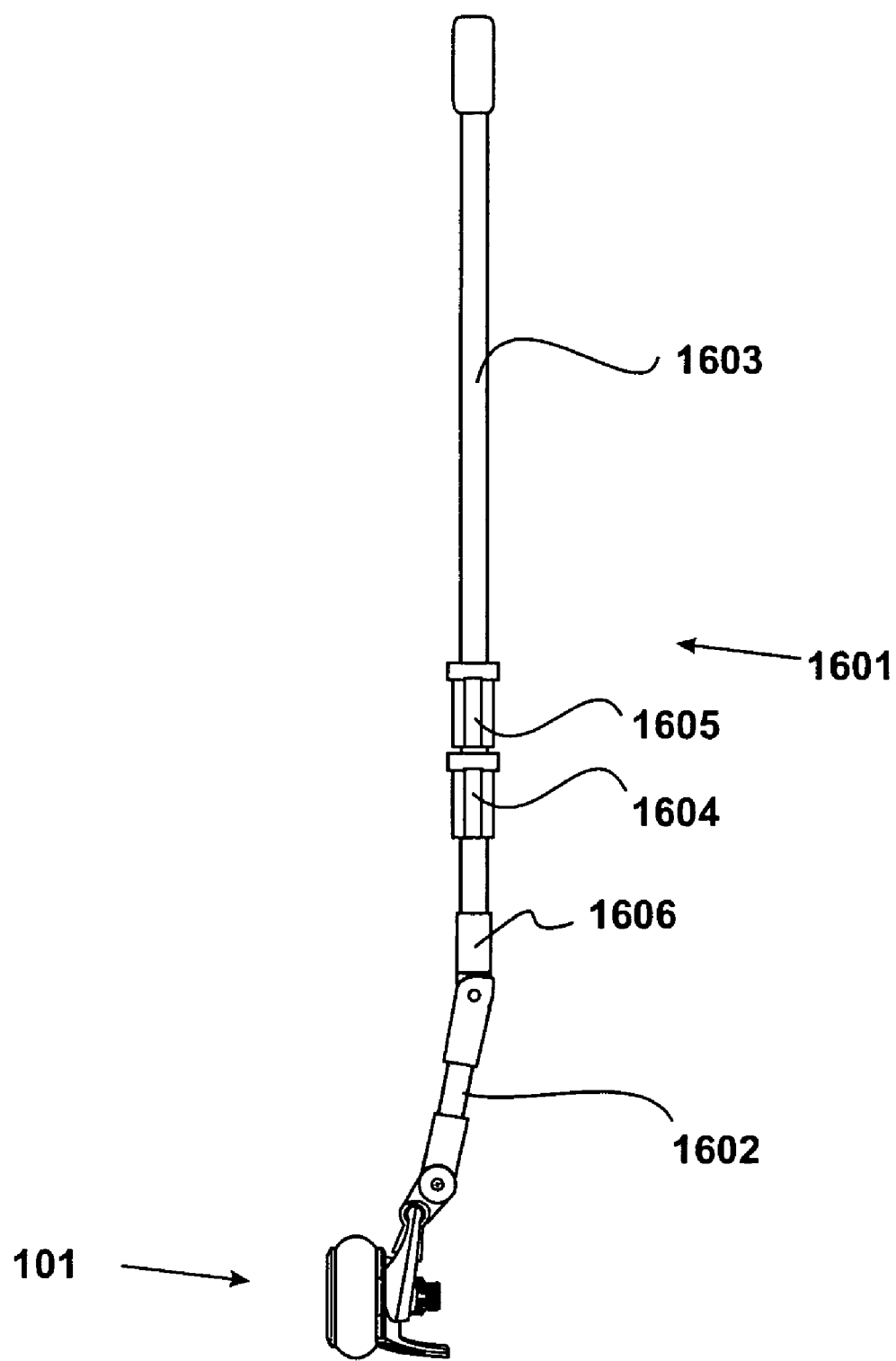
FIG. 16 shows a remote installation device 1601 with the pipe stopper 101 from FIG. 1.

A remote installation device 1601 is shown with the pipe stopper 101 in FIG. 16. The remote installation device 1601 comprises a lever extension arm 1602 pivotally connected to an elongate handle 1603. The elongate handle 1603 comprises three sections arranged to fold up telescopically to the folded configuration shown in FIG. 16. The handle 1603 is provided with securing devices 1604 and 1605 which, when locked, fix the relative positions of the sections. Thus, to adjust the length of the handle 1603, the securing devices 1604 and/or 1605 are released, the length adjusted, and then the securing devices re-locked.

The handle 1603 comprises an Extender Telescopic System, as produced by Exel Industries of Finland, received into a hinge member 1606 which forms part of a hinge mechanism attaching the handle 1603 to the lever extension member 1602.

In alternative embodiments the handle is non-telescopic, being made from a single length of aluminium or fibre glass reinforced tube. In a further alternative embodiment the handle is telscopically folding but has just two sections rather than three.

FIGS. 17A and 17B

A side view of the lower parts of the remote installation device 1601 and the pipe stopper 101 is shown in FIG. 17A with a corresponding rear view shown in FIG. 17B.

The lever extension member 1602 includes a socket 1701 at one end which is configured to receive and retain the handle 110 and adjacent parts of the arms 202 of lever 108 of pipe stopper 101. The socket 1701 is provided with a pair of holes 1710 through which fasteners, such as bolts or clips, may be inserted to ensure that the pipe stopper is securely retained by the socket. At its opposite end, lever extension member 1602 is connected to the lower end of the handle 1603 by a pivot pin 1702.

The hinge member 1606, at the lower end of the elongate handle 1603, has a flat surface 1703 defining a stop to restrict the possible angles between the lever extension arm 1602 and said handle. The upper end of the lever extension arm 1602 is profiled with a curved portion 1704 and a flat portion 1705. The curved portion 1704 allows the angle between the extension member 1602 and the handle 1603 to be reduced from that shown in FIG. 17A, while the flat portion is configured to butt up against the stop 1703, as shown in said Figure, to prevent the angle from increasing further. In the present embodiment, the stop prevent the angle between the handle and the lever extension arm from increasing beyond a predetermined angle of 170 degrees. However, other predetermined angles between 150 degrees and 180 degrees are envisaged.

Figure 18:
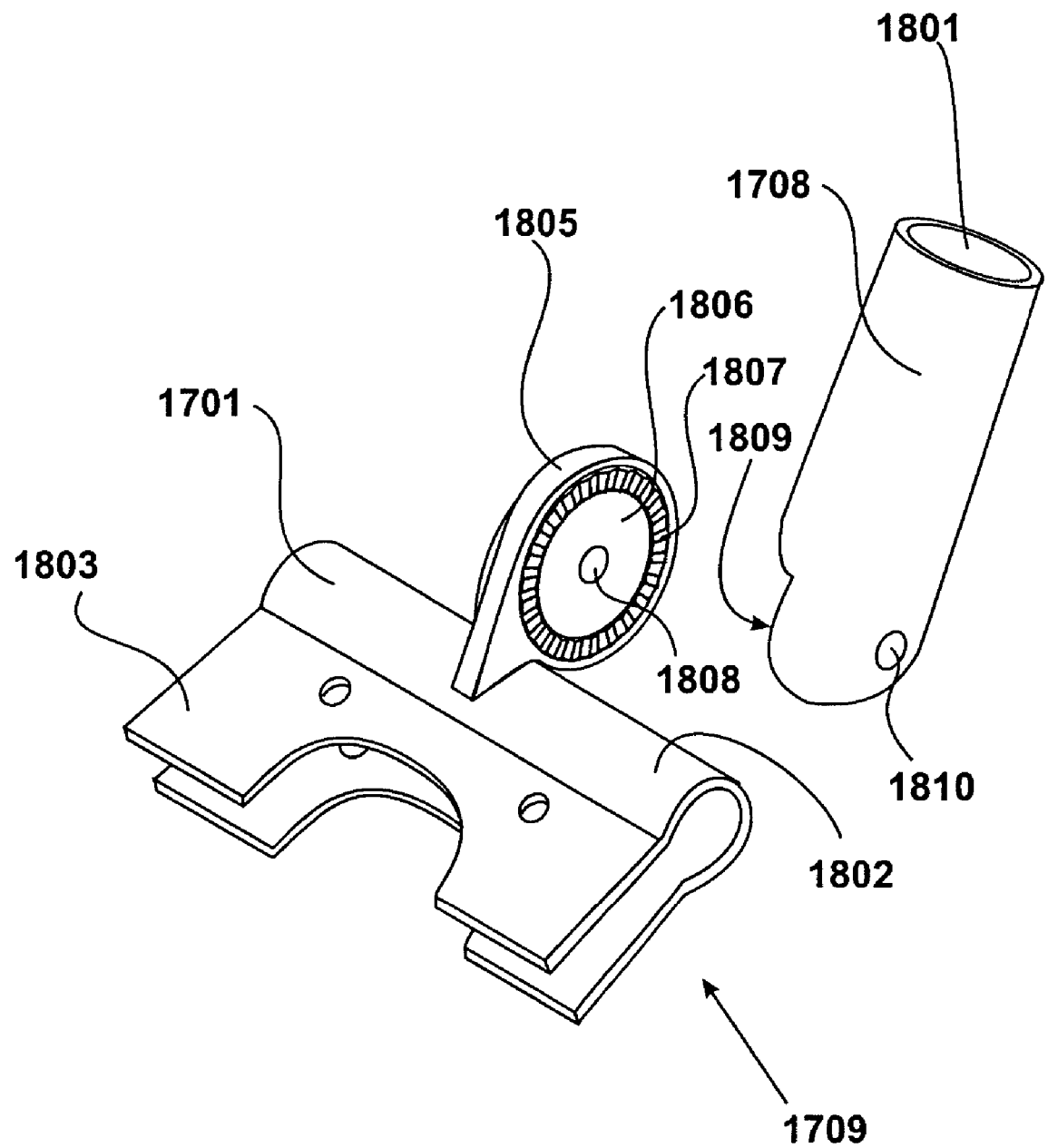
FIG. 18 shows the two parts 1708 and 1709 of the socket member from FIG. 17A in further detail.

The lever extension member 1602 comprises a hinge member 1705, a cylindrical tube 1706 and a socket member 1707; the socket member itself including the socket 1701. The ends of the cylindrical tube 1706 are rigidly secured within cylindrical holes in the hinge member 1705 and the socket member 1707 respectively by an adhesive. (The cylindrical hole in the socket member is shown in FIG. 18 as hole 1801.)

In the present case the hinge members 1705 and 1606, and the socket member 1707 are formed in a rigid plastics material by injection moulding, while the cylindrical tube 1706 is a length of glass fibre reinforced resin tube.

In the present embodiment the socket member 1707 comprises two parts 1708 and 1709 fixed together by a screw fastener 1711.

In an alternative embodiment, the socket member is a single molded component.

FIG. 18

The two parts 1708 and 1709 of the socket member are shown in further detail in FIG. 18.

The lower part 1709 includes the socket which is in the form of an open sided cylinder from which extend a pair of plates 1803. A connector part 1805 is rigidly attached to the open sided cylinder 1802. The connector part 1805 has a flat surface 1806 from which extend a circle of teeth 1807 concentric with a hole 1808 for receiving the fastener 1711.

The upper part 1708 of the socket member defines an axial hole 1801 for receiving the cylindrical tube 1706. It also has a flat surface 1809 with a circle of teeth (not shown) concentric with a hole 1810 for receiving the fastener. The teeth of the upper part 1708 are configured to interlock with the teeth 1807 of the lower part. Thus when the fastener 1711 holds the two parts 1708 and 1709 together, relative rotation of said parts is prevented. However, if, for any particular operation, the angle between the two parts requires adjustment, then the fastener may be released and the adjustment made.

FIG. 19

Figure 19:
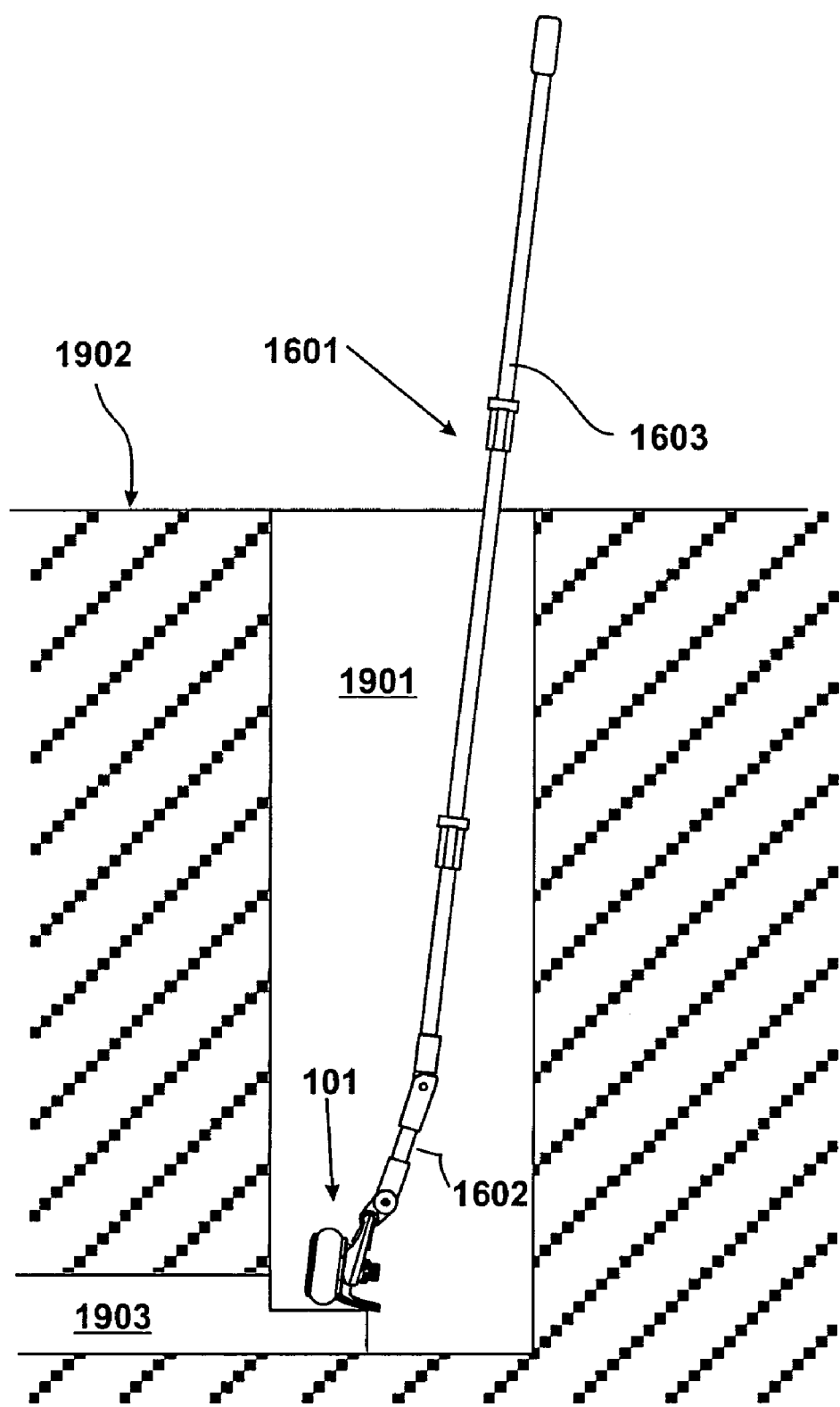
FIG. 19 shows the pipe stopper 101 being lowered into a manhole 1901 of a sewer by means of the remote installation device 1601.
Figure 20:
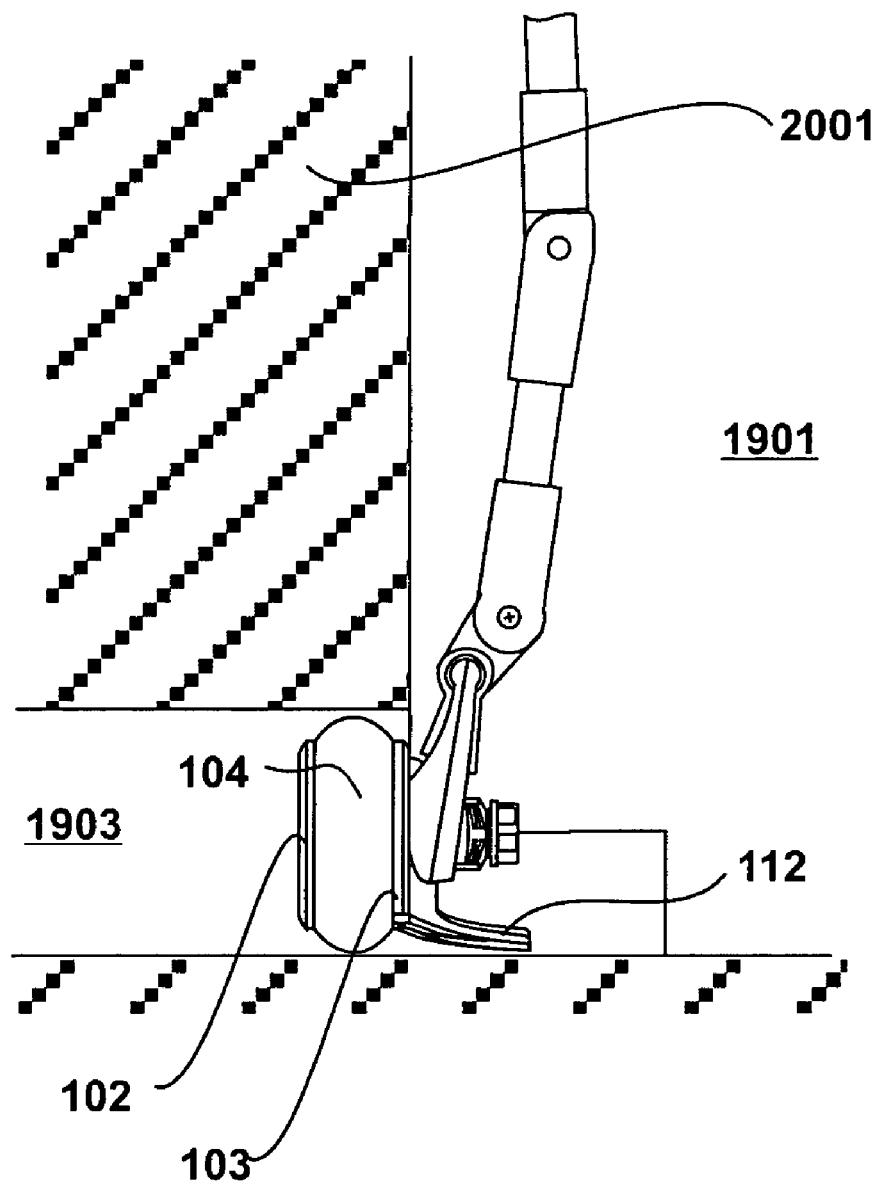
FIG. 20 shows the lower part of the remote installation device 1601 with the pipe stopper 101 inserted into the end of a pipe 1903.
Figure 21:
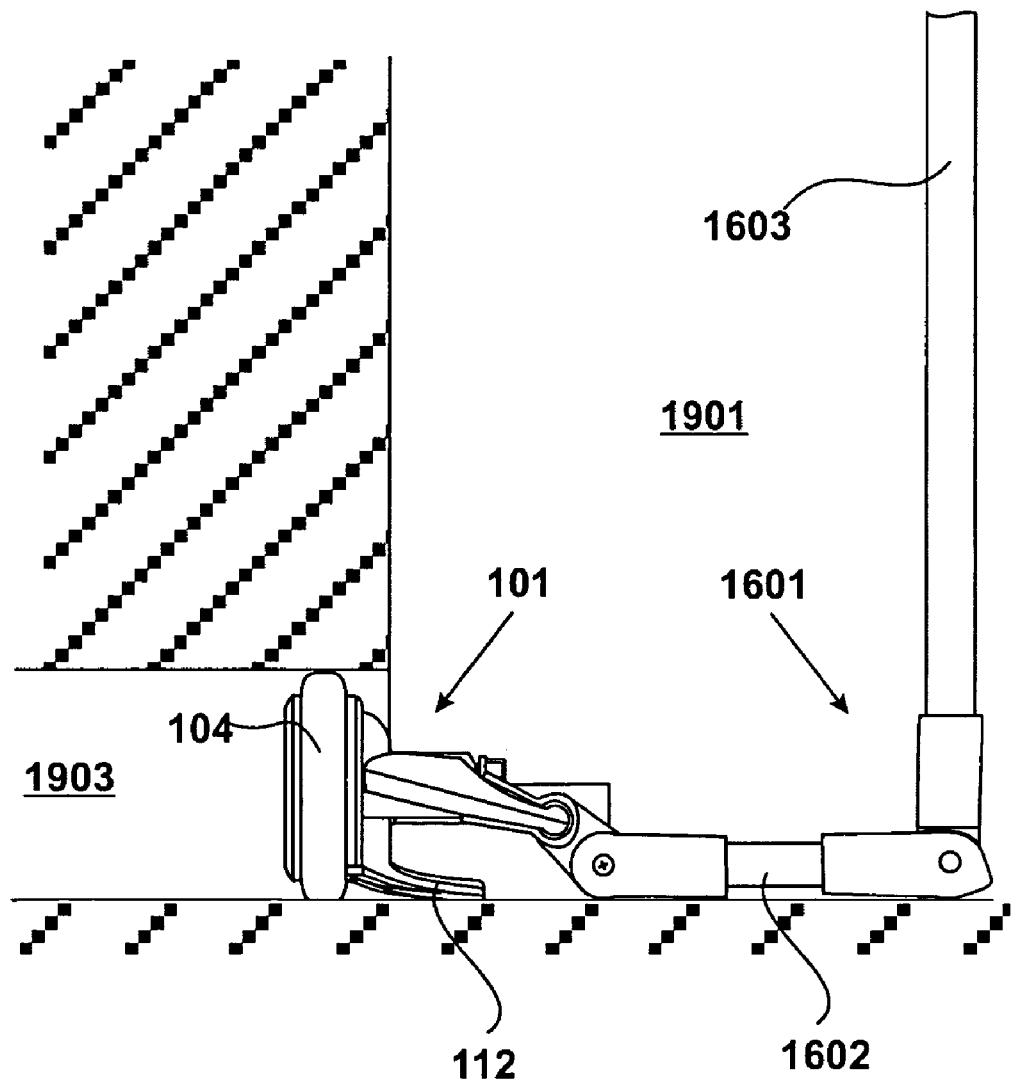
FIG. 21 shows the pipe stopper 101 and remote installation device 1601 with the seal 104 radially expanded against the pipe wall.

The use of the remote installation device 1601 is illustrated by FIGS. 19, 20 and 21. The pipe stopper 101 is shown in FIG. 19 being lowered into a manhole 1901 of a sewer by means of the remote installation device 1601. In this example the elongate handle 1603 has been unfolded to an extended configuration. A user (not shown) remains above ground level 1902 and manipulates the upper part of the handle 1603 by hand to position the pipe stopper 101 within the end of a pipe 1903.

The angle between the handle 1603 and the lever extension arm 1602 is prevented from opening wider by the stop 1703, and so the orientation of the extension arm and the pipe stopper 101 is under the control of the user.

FIG. 20

The lower part of the remote installation device 1601 and the pipe stopper 101 is shown in FIG. 20 after the pipe stopper has been inserted into the end of the pipe 1903. The user manipulates the handle to bring the plates 102 and 103 within the pipe such that they are perpendicular to the pipe bore, and this is assisted by the contact member 112.

As illustrated by FIG. 20, the angle between the extension arm 1602 and the handle 1603 allows the pipe stopper to be located within the pipe without the wall 2001 of the manhole interfering with the remote installation device.

When the seal has been correctly positioned, the user pushes down axially along the handle 1603, causing the angle between the lever extension arm 1602 and the handle 1603 to reduce. A reaction force from the pipe wall on the contact member 112 prevents the pipe stopper 101 from tilting out of position. Consequently, the lever 108 is rotated by the remote installation device from its first position to its second position in which the plates 102 and 103 are brought closer together, and the flexible seal 104 is radially expanded against the wall of the pipe.

FIG. 21

The pipe stopper 101 and remote installation device 1601 are shown in FIG. 21 after the seal has been radially expanded against the pipe wall. Thus the pipe 1903 is sealed by the pipe stopper 101 while the user remains above ground level and avoids having to climb down into the confined space of the manhole.

When the user wishes to remove the pipe stopper, they again remain above ground level and pull axially on the handle 1603, to return the lever to its first orientation, allowing the flexible seal to radially contract and unplug the pipe. The pipe stopper is then removed from the pipe and the manhole by further manual manipulation of the elongate handle 1603.

In the above example the remote installation device 1601 was used in co-operation with the pipe stopper 101. However, it may be used with other lever operated expandable pipe stoppers, such as pipe stopper 1001.

Although, for the purposes of the above description the pipe stopper and remote installation device has been separately labelled as such, these two items in combination are also regarded as a pipe stopper.

FIGS. 22A and 22B

A side view and a rear view of an alternative pipe stopper 2201 is shown in FIGS. 22A and 22B respectively. The pipe stopper 2201 is similar to pipe stopper 101, except the lever 108 has been replaced by an elongated lever 2208, hingedly connected to an elongate handle 2203. The lever 2208, like lever 108 is moulded in a plastics material with cam portions 2209 as a single unit. The lever 2208 is moulded around a stainless steel strengthening rod to which a pair of profiled plates 2220 are rigidly attached. The profiled plates form part of a hinge mechanism connecting the lever 2208 with the handle 2203.

The handle in this case is formed from an aluminium tube having a stainless steel plate 2221 rigidly secured within its lower end. The stainless steel plate 2221 and the profiled plates 2220 each have an aligned hole through which a pivot pin 2222 extends.

The profiled plates have: a curved portion allowing the lever 2208 to pivot around the pin 2222 to reduce the angle between the lever and the handle; and a flat portion which is configured to butt up against the bottom of the handle as shown in FIG. 22A and prevent the angle from opening further. Thus the bottom of the handle, in co-operation with the flat portion of the profiled plates provides a stop.

The operation of the pipe stopper 2201 is substantially the same as the pipe stopper 101 when used in combination with the remote installation device 1601.

What I claim is:

1. A pipe stopper for inserting within a pipe comprising:
   two rigid circular plates;
   an ouwardly-expandable flexible seal located between peripheral surfaces of the plates;
   a projection rigidly secured to or integral with a first of the plates and extending slideably through an aperture defined by the second plate;
   a lever pivotable about an axis through the projection;
   cam means rigidly secured to or integral with the lever such that said lever is pivotable between a first orientation in which the flexible seal is relatively undistorted and a second orientation in which the cam means force the plates towards each other so as to axially compress and radially expand the seal for engaging with sealing contact with a wall of a pipe; and
   a member rigidly secured to or integral with only a part of a remote peripheral surface of one of the plates, said member extending from the plate at a position such that when the pipe stopper is located within a pipe said member provides a reactive force to tilting of the pipe stopper from its operative position while said lever is pivoted to its second orientation to expand the flexible seal.

2. An expandable pipe stopper according to claim 1, wherein the member is integral with or rigidly secured to the second plate.

3. An expandable pipe stopper according to claim 1, further comprising a pivot mechanism about which said lever is pivotable, wherein said projection defines a part of said pivot mechanism defining said axis through the projection, and the distance from the first plate to the axis through the projection is fixed.

4. An expandable pipe stopper according to claim 1, wherein said projection defines a pair of recesses concentric with said axis through the projection, and the lever carries two pivot pins each of which has an enlarged head that is adapted to fit in one of said associated recesses.

5. An expandable pipe stopper according to claim 1, wherein said projection defines a pair of recesses concentric with said axis through the projection, each recess having an associated cranked slot, and the lever carries two pivot pins each of which has:
   an enlarged head adapted to fit in an associated one of said recesses;
   and an eccentric portion configured to (i) slide through one of the cranked slots to install the lever on the projection while the lever is in a third orientation and (ii) resist sliding through the cranked slot when the lever is rotated between the first orientation and the second orientation.

6. An expandable pipe stopper according to claim 5, wherein said eccentric portions of said pivot pins have a flat side to provide said eccentric portions with eccentricity.

7. An expandable pipe stopper according to claim 1, wherein said projection is a single projection extending along the common axis of said plates.

8. An expandable pipe stopper according to claim 7, wherein said projection and said aperture are configured to prevent relative rotation of said plates.

9. An expandable pipe stopper according to claim 1, wherein said lever is connected to an elongate handle by a hinging mechanism.

10. An expandable pipe stopper according to claim 1, wherein said handle is telescopically foldable.

11. A pipe stopper according to claim 1 having a remote installation device comprising:
   an arm rigidly attached to a said lever of a said pipe stopper;
   an elongate handle connected to said arm by a hinging mechanism; and
   a stopping means which prevents the angle between the handle and the member increasing beyond a predetermined value.

12. A pipe stopper comprising:
   a pair of coaxial plates;
   a flexible seal located between the plates, said seal being configured to radially expand for sealing a pipe;
   a projection rigidly secured to or integral with a first of the plates and extending slideably through an aperture defined by the second plate;
   a cam configured to act on one of the plates to bring said plates together to radially expand the flexible seal; and
   a lever rigidly attached to or integral with said cam and pivotally mounted about an axis through the projection;
   and an elongate handle pivotally attached to said lever at a position remote from said cam, such that said lever is operable by applying a force along said handle.

13. A pipe stopper according to claim 12, having a means for preventing the angle between the elongate handle and the lever from opening past a predetermined angle.

14. A pipe stopper according to claim 13, wherein said predetermined angle is obtuse to allow the flexible seal of the pipe stopper to be lowered below ground level and positioned within a pipe by manual manipulation of said elongate handle.

15. A pipe stopper according to claim 12, wherein said lever comprises a shorter lever secured within a lever extension arm, and said lever extension arm is pivotally connected to said handle.

16. Art A pipe stopper according to claim 12, wherein said pipe stopper further comprises a contacting member rigidly secured to one of said plates and configured to contact the bore of a pipe to provide a reactive force to tilting the stopper when located within said pipe.

17. An expandable pipe stopper according to claim 16, wherein said lever is pivotally connected to said projection and said cam acts on the other of said plates.

18. A pipe stopper for inserting within a pipe comprising:
   two rigid circular plates;
   an outwardly-expandable flexible seal located between peripheral surfaces of the plates;
   a projection rigidly secured to or integral with a first of the plates and extending slideably through an aperture defined by the second plate;
   a lever pivotable about an axis through the projection;
   cam means rigidly secured to or integral with the lever such that said lever is pivotable between a first orientation in which the flexible seal is relatively undistorted and a second orientation in which the cam means force the plates towards each other so as to axially compress and radially expand the seal for engaging with sealing contact with a wall of a pipe; and
   a member rigidly secured to or integral with part of a remote peripheral surface of one of the plates, said member extending from the plate at a position such that when the pipe stopper is located within a pipe said member provides a reactive force to tilting of the pipe stopper from its operative position;
   wherein said projection defines a pair of recesses concentric with said axis through the projection, and a pair of slots defined in a face of the projection which communicate with a respective one of the recesses, and the lever carries two pivot pins each of which has an enlarged head that is adapted to slide through a respective one of said slots and to fit in an associated one of said recesses.

19. An expandable pipe stopper according to claim 18, wherein said projection defines a pair of recesses concentric with said axis through the projection, each recess having an associated cranked slot, and the lever carries two pivot pins each of which has:
   an enlarged head adapted to fit in an associated one of said recesses;
   and an eccentric portion configured to (i) slide through one of the cranked slots to install the lever on the projection while the lever is in a third orientation and (ii) resist sliding through the cranked slot when the lever is rotated between the first orientation and the second orientation.

20. An expandable pipe stopper according to claim 19, wherein said eccentric portions of said pivot pins have a flat side to provide said eccentric portions with eccentricity.

* * * * *